(12) United States Patent
Rastegar et al.

(10) Patent No.: US 7,312,557 B2
(45) Date of Patent: Dec. 25, 2007

(54) MASS-SPRING UNIT FOR GENERATING POWER BY APPLYING A CYCLIC FORCE TO A PIEZOELECTRIC MEMBER DUE TO AN ACCELERATION OF THE MASS-SPRING UNIT

(75) Inventors: Jahangir S. Rastegar, Stony Brook, NY (US); David Haarhoff, Adelaide (AU)

(73) Assignee: Omnitek Partners LLC, Bayshore, NY (US)

( * ) Notice: Subject to any disclaimer, the term of this patent is extended or adjusted under 35 U.S.C. 154(b) by 32 days.

(21) Appl. No.: 11/116,093

(22) Filed: Apr. 27, 2005

(65) Prior Publication Data

US 2006/0033406 A1 Feb. 16, 2006

Related U.S. Application Data

(60) Provisional application No. 60/600,455, filed on Aug. 11, 2004.

(51) Int. Cl.
*H01L 41/113* (2006.01)

(52) U.S. Cl. ............. 310/339; 102/206; 102/207; 102/208; 102/209; 102/210

(58) Field of Classification Search ......... 310/339; 102/206–210
See application file for complete search history.

(56) References Cited

U.S. PATENT DOCUMENTS

| | | | | | |
|---|---|---|---|---|---|
| 3,633,511 | A | * | 1/1972 | Maury | 102/210 |
| 3,815,505 | A | * | 6/1974 | Roh et al. | 102/210 |
| 3,859,746 | A | * | 1/1975 | Pecksen | 102/210 |
| 3,963,966 | A | * | 6/1976 | Mohr | 310/339 |
| 2003/0041767 | A1 | * | 3/2003 | Rastegar et al. | 102/207 |

* cited by examiner

*Primary Examiner*—J. San Martin

(57) ABSTRACT

An apparatus for generating an electrical power upon an acceleration of the apparatus is provided. The apparatus including: a piezoelectric member having at least a portion thereof formed of a piezoelectric material; and a mass-spring unit having a spring element attached to the piezoelectric material and configured to compress and/or elongate within a predetermined limit, the mass-spring unit further having a mass offset from the piezoelectric material; wherein the mass-spring unit is configured to vibrate within the predetermined limit, upon the acceleration of the apparatus, the vibration applying a cyclic force to the piezoelectric member to generate an output power from the piezoelectric member.

15 Claims, 18 Drawing Sheets

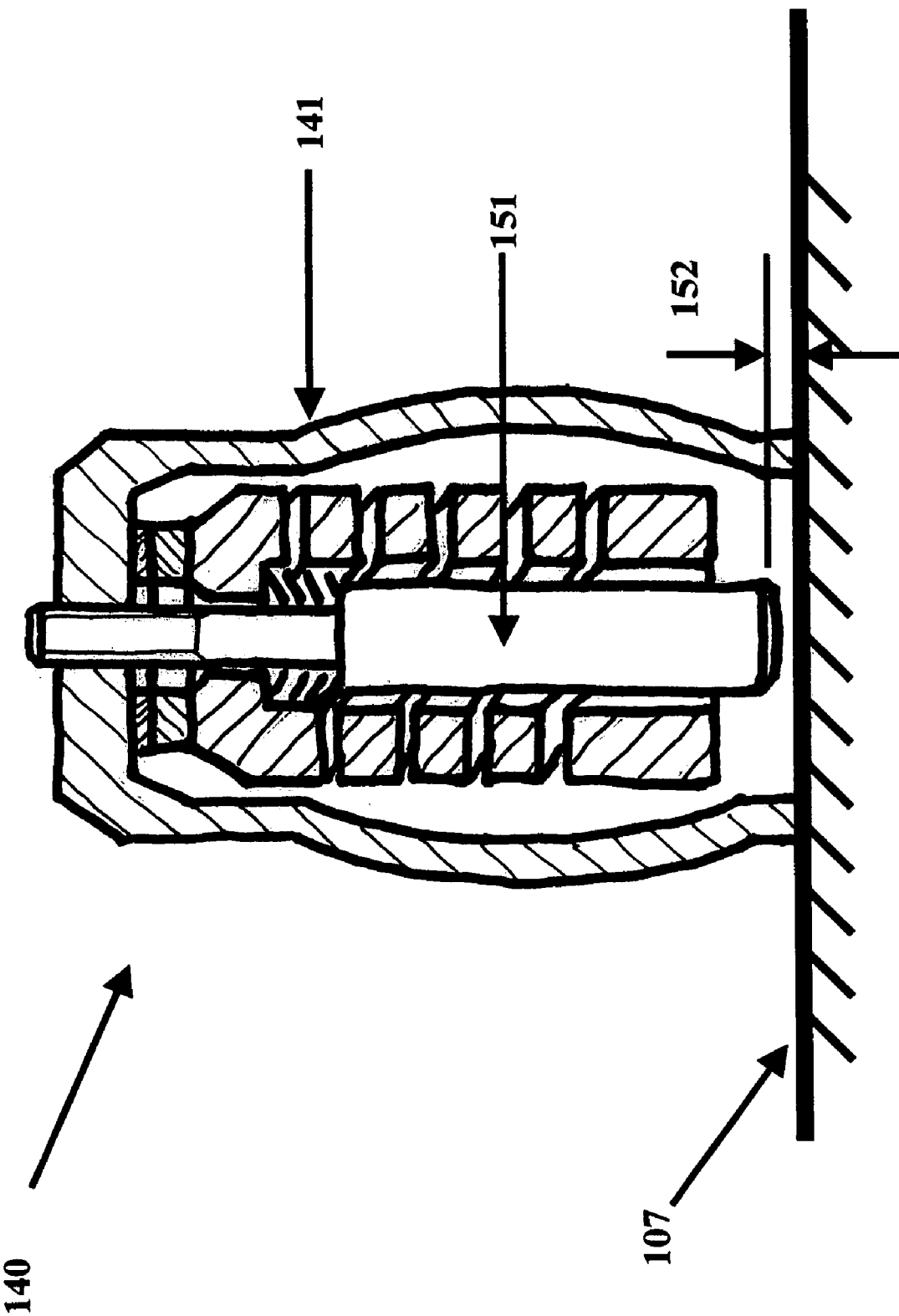

MASS-SPRING UNIT FOR GENERATING POWER BY APPLYING A CYCLIC FORCE TO A PIEZOELECTRIC MEMBER DUE TO AN ACCELERATION OF THE MASS-SPRING UNIT

CROSS-REFERENCE TO RELATED APPLICATION

This application claims priority to earlier filed U.S. provisional application Ser. No. 60/600,455 filed on Aug. 11, 2004, the entire contents of which is incorporated herein by its reference.

GOVERNMENTAL RIGHTS

This invention was made with Government support under Contract No. DAAE30-03-C1077, awarded by the U.S. Army. The Government may have certain rights in this invention.

BACKGROUND OF THE INVENTION

1. Field of the Invention

The present invention relates generally to power supplies, and more particularly, to power supplies for projectiles, which generate power due to an acceleration of the projectile.

2. Prior Art

All existing and future smart and guided projectiles and those with means of one-way or two-way communications with a command or tracking station or with each other require electric power for their operation. In addition, as munitions are equipped with the means of communicating their type and characteristics with the firing system to ensure that the intended round is being used and for fire control purposes, and for health monitoring and diagnostics runs before loading, they would require a low level of power supply minutes and sometimes even seconds before being loaded into the gun system. The amount of power required for the proper operation of such smart and guided munitions or those equipped with the aforementioned health monitoring and diagnostics capabilities, is dependent on their mode of operation and the on-board devices that have to be powered. The amount of power requirement is fairly small if the projectile is required to only receive a RF or other similar signal and to power sensors such as MEMs types of accelerometers and rate gyros or health monitoring and diagnostics related electronics. The power requirement is increased if the projectile is also required to communicate back to the ground or some mobile station. The power requirement, however, becomes significant when the projectile has to be equipped with electric or smart materials based actuation devices for guidance and control, particularly if the projectile is required to become highly maneuverable over long traveling times and while traveling at relatively high speeds such as supersonic speeds.

SUMMARY OF THE INVENTION

Accordingly, an apparatus for generating an electrical power upon an acceleration of the apparatus is provided. The apparatus comprising: a piezoelectric member having at least a portion thereof formed of a piezoelectric material; and a mass-spring unit having a spring element attached to the piezoelectric material and configured to compress and/or elongate within a predetermined limit, the mass-spring unit further having a mass offset from the piezoelectric material; wherein the mass-spring unit is configured to vibrate within the predetermined limit upon the acceleration of the apparatus, the vibration applying a cyclic force to the piezoelectric member to generate an output power from the piezoelectric member.

The mass can be a portion of the spring element.

The mass can be a separate portion from the spring element and attached thereto.

The apparatus can further comprise means for preloading the piezoelectric material in compression. The apparatus can further comprise means for adjusting an amount of the preloading.

The apparatus can further comprise a housing having an internal cavity for containing the piezoelectric member and mass-spring unit in the internal cavity. The housing comprises means for collapsing in a direction of the acceleration to limit an amount of movement of the spring element. The means for collapsing can comprise the housing being an additional spring member having a greater spring coefficient than the spring element. The means for collapsing can comprise the, housing having a curved shape for facilitating collapse thereof where the acceleration is greater than a predetermined limit.

The apparatus can further comprise limiting means for limiting a loading on the piezoelectric member due to the impact. The limiting means can comprise sandwiching the piezoeLectric member between the spring element and an intermediate member, wherein one of the spring element and intermediate member have a stop for contacting the other of the spring element and intermediate member where the acceleration reaches a predetermined limit. The limiting means can comprise an intermediate element having a tapered surface, wherein the spring element has an opposing tapered surface for mating with the tapered surface of the intermediate element where the acceleration reaches a predetermined limit. The limiting means can comprise the spring element having a flange for contacting a surface of an intermediate element where the acceleration reaches a predetermined limit. The intermediate element can have first and second surfaces and wherein the flange contacts the first surface where the acceleration reaches a predetermined limit and the flange contacts the second surface where a deceleration reaches another predetermined limit.

The mass-spring unit can comprise fist and second mass-spring units having first and second spring elements and the piezoelectric member comprises first and second piezoelectric members corresponding to the first and second mass-spring units, respectively. The mass can be positioned between the first and second spring elements. The first spring element, second spring element,and mass can be a single integral member.

Also provided is a method for generating an electrical power upon an acceleration of an apparatus. The method comprising: accelerating the apparatus; and applying a cyclic force to a piezoelectric material resulting from the acceleration.

BRIEF DESCRIPTION OF THE DRAWINGS

These and other features, aspects, and advantages of the apparatus and methods of the present invention will become better understood with regard to the following description, appended claims, and accompanying drawings where:

FIG. 5b illustrates a first variation of the power generator of FIG. 5a.

FIG. 5c illustrates a second variation of the power generator of FIG. 5a.

FIG. 5d illustrates a third variation of the power generator of FIG. 5a.

FIG. 5e illustrates a fourth variation of the power generator of FIG. 5a.

FIG. 5f illustrates a fifth variation of the power generator of FIG. 5a.

FIG. 5g illustrates a sixth variation of the power generator of FIG. 5a.

DETAILED DESCRIPTION OF THE PREFERRED EMBODIMENT

Figure 1:
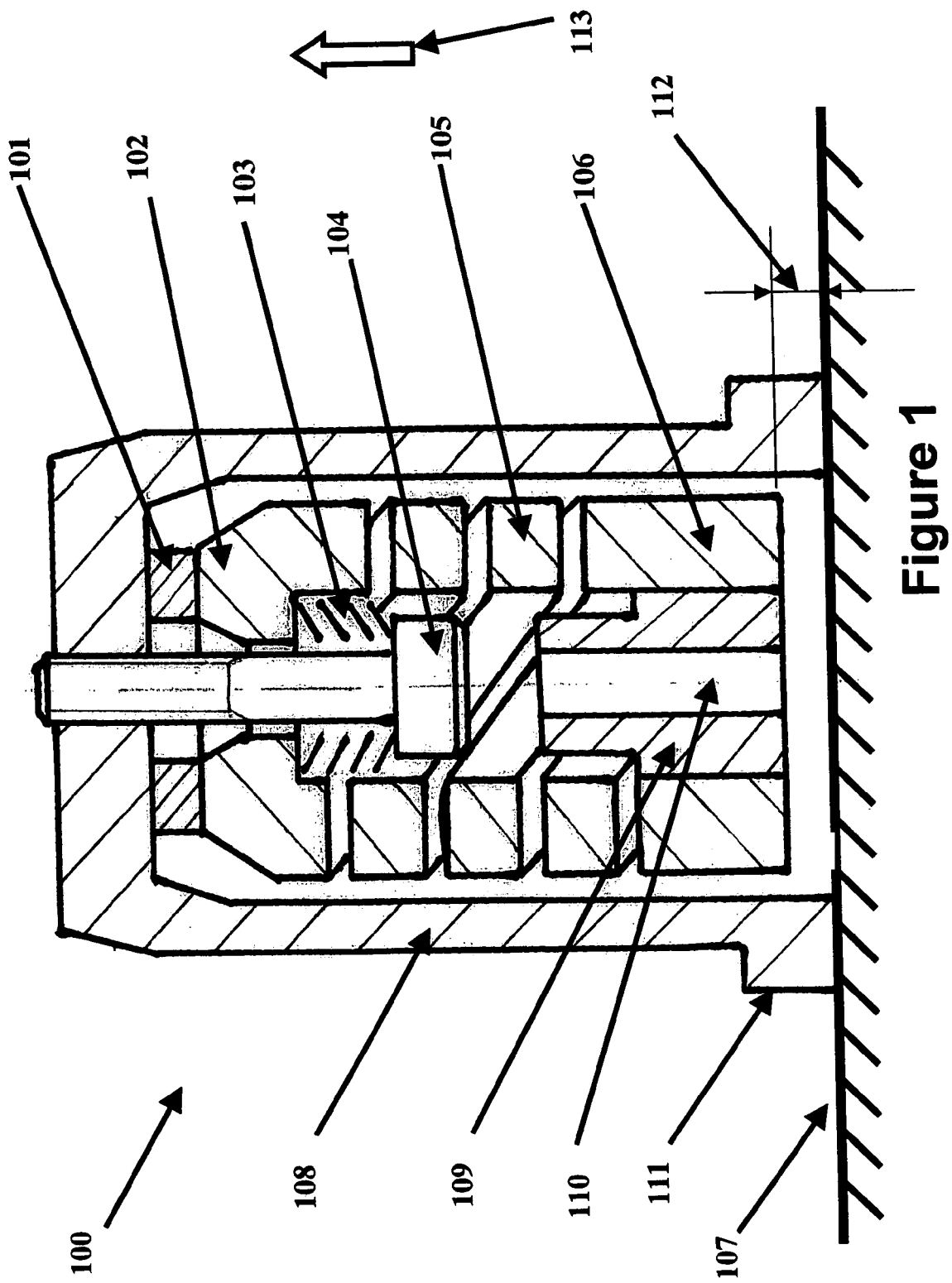
FIG. 1 illustrates a schematic cross section of a power generator according to a first embodiment.

In the methods and apparatus disclosed herein, the spring end of a mass-spring unit is attached to a housing (support) unit via one or more piezoelectric elements, which are positioned between the spring end of the mass-spring and the housing unit. A housing is intended to mean a support structure, which partially or fully encloses the mass-spring and piezoelectric elements. On the other hand, a support unit may be positioned interior to the mass-spring and/or the piezoelectric elements or be a frame structure that is positioned interior and/or exterior to the mass-spring and/or piezoelectric elements. The assembly is provided with the means to preload the piezoelectric element in compression such that during the operation of the power generation unit, tensile stressing of the piezoelectric element is substantially avoided. The entire assembly is in turn attached to the base structure (e.g., gun-fired munitions). When used in applications that subject the power generation unit to relatively high acceleration/deceleration levels, the spring of the mass-spring unit is allowed to elongate and/or compress only within a specified limit. Once the applied acceleration/deceleration has substantially ended, the mass-spring unit begins to vibrate, thereby applying a cyclic force to the piezoelectric element, which in turn is used to generate electrical energy. The housing structure or the base structure or both may be used to provide the limitation in the maximum elongation and/or compression of the spring of the mass-spring unit (i.e., the amplitude of vibration). Each housing unit may be used to house more than one mass-spring unit, each via at least one piezoelectric element.

In the following schematics of the various embodiments, the firing acceleration is considered to be upwards as indicated by arrow 113.

In a first embodiment, power generator 100 includes a spring 105, a mass 110, an outer shell 108, a piezoelectric (stacked and washer type) generator 101, one socket head cap screw 104 and a stack of Belleville washers 103 (each of the washers 103 in the stack is shown schematically as a single line). Piezoelectric materials are well known in the art. Furthermore, any configuration of one or more of such materials can be used in the power generator 100. Other fasteners, which may be fixed or removable, may be used and other means for applying a compressive or tensile load on the piezoelectric generator 101 may be used, such as a compression spring. The piezoelectric generator 101 is sandwiched between the outer shell 108 and an end 102 of the spring, and is held in compression by the Belleville washer stack 103 (i.e., preloaded in compression) and the socket head cap screw 104. The mass 109 is attached (e.g., screwed, bonded using adhesives, press fitted, etc.) to another end 106 of the spring 105. The piezoelectric element 101 is preferably supported by a relatively flat and rigid surface to achieve a relatively uniform distribution of force over the surface of the element. This might be aided by providing a very thin layer of hard epoxy or other similar type of adhesives on both contacting surfaces of the piezoelectric element. The housing 108 may be attached to the base 107 by the provided flange 111 using well known methods, or any other alternative method commonly used in the art such as screws or by threading the outer housing and screwing it to a tapped base hole, etc. The mass 109 is provided with an access hole 110 for tightening the screw 104 during assembly. Between the free end 106 of the spring and the base 107 (or if the mass 109 projects outside the end 106 of the spring, then between the mass 109 and the base 107) a gap 112 is provided to limit the maximum expansion of the spring 105. Alternatively, the gap 112 may be provided by the housing 108 itself. The gap 112 also limits the maximum amplitude of vibration of the mass-spring unit.

During firing of a projectile (the base structure 107) containing such power generator 100, the firing acceleration is considered to be in the direction 113. The firing acceleration acts of the mass 109 (and the mass of the spring 105), generating a force in a direction opposite to the direction of the acceleration that tends to elongate the spring 105 until the end 106 of the spring (or the mass 109 if it is protruding from the end 106 of the spring) closes the gap 112. For a given power generator 100, the amount of gap 112 defines the maximum spring extension, thereby the maximum (tensile) force applied to the piezoelectric element 101. As a result, the piezoelectric element is protected from being damaged by tensile loading. The gap 112 also defines the maximum level of firing acceleration that is going to be utilized by the power generator 100.

In applications where high levels of acceleration (deceleration) are present in both directions (direction 113 and in its opposite direction), then similar stops may be provided to limit spring compression. This can be achieved by providing flanges on the end 106 of the spring 105 and stops to prevent compression of the spring element 105 over a predetermined limit, for example as shown in FIG. 2. FIG. 2 shows a partial cross-section of the side of the power generator assembly that is connected to the base structure 107, with the remaining part of the assembly being identical to that shown in FIG. 1. A free end 122 of the spring unit (with or without the mass 121) is provided with a flange 127. A flanged ring 123 is then positioned around the flange 127 before assembling the unit inside the housing 124. Once attached to the base structure 107, a housing lip 128 keeps the flanged ring 123 in contact with the base structure 127, thereby limiting the motion of the free end 122 of the spring unit within the distances 125 and 126, up and down, respectively.

When the firing acceleration has ended, i.e., after the projectile has exited the gun barrel, the mechanical (potential) energy stored in the elongated spring is available for conversion into electrical energy. In all the present power generators, this is accomplished by harvesting the varying voltage generated by the piezoelectric element 101 as the mass-spring element vibrates. The spring rate and the maximum allowed deflection determine the amount of mechanical energy that is stored in the spring 105. The effective mass and spring rate of the mass-spring unit determine the frequency (natural frequency) with which the mass-spring element vibrates. By increasing (decreasing) the mass or by decreasing (increasing) the spring rate of the mass-spring unit, the frequency of vibration is decreased (increased). In general, by increasing the frequency of vibration, the mechanical energy stored in the spring 105 can be harvested at a faster rate. Thus, by selecting appropriate spring 105, mass 109 and gap 112, the amount of electrical energy that can be generated and the rate of electrical energy generation can be matched with the requirements of a projectile.

Figure 2:
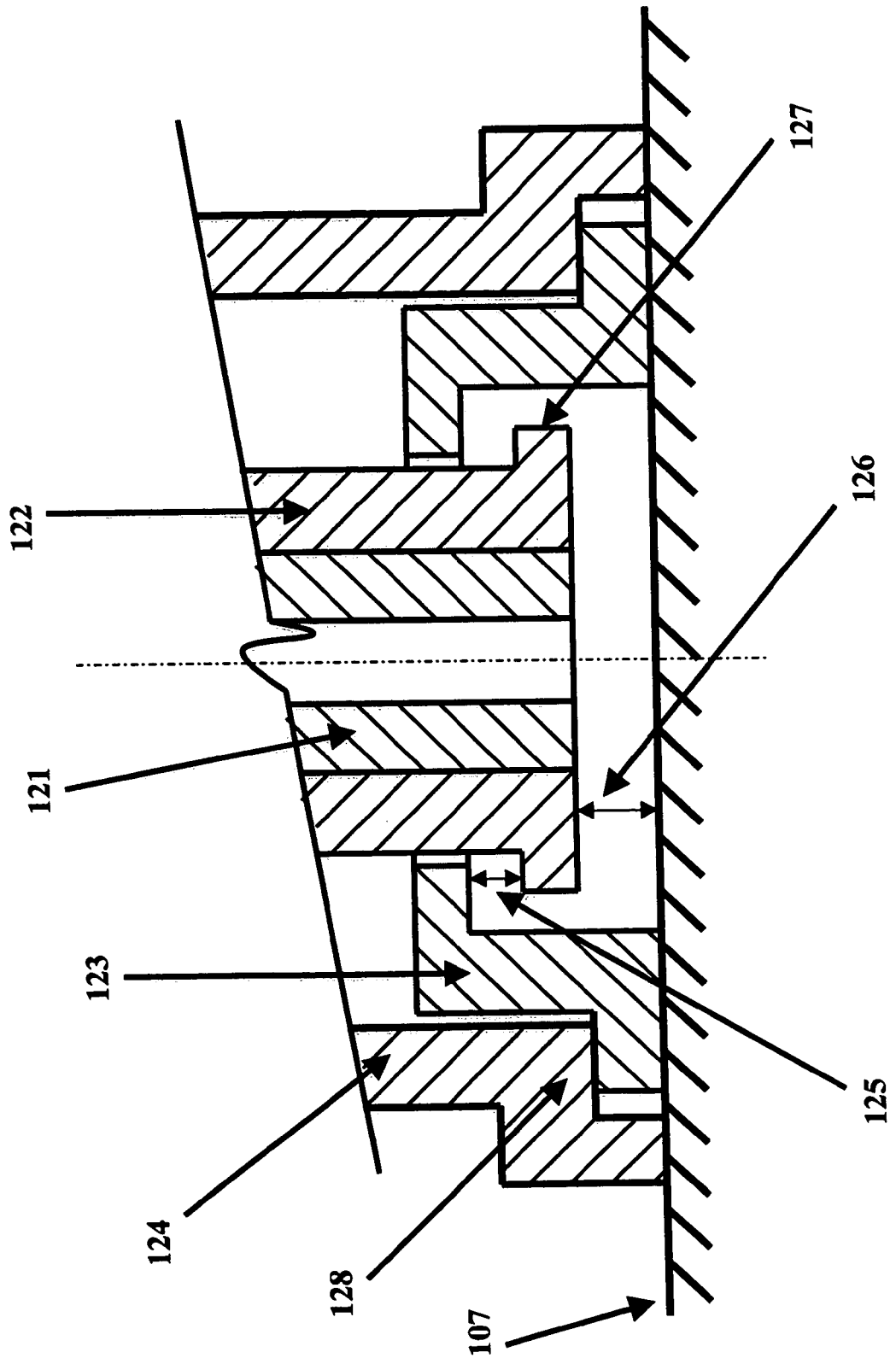
FIG. 2 illustrates a variation of the power generator of FIG. 1.

In FIG. 1, the spring 105 is shown to be a helical spring. The preferred helical spring, however, has three or more equally spaced helical strands to minimize the sideways bending and twisting of the spring during vibration. In general, any other type of spring may be used as long as they provide for vibration in the direction of providing cyclic tensile-compressive loading of the piezoelectric element.

Figure 3:
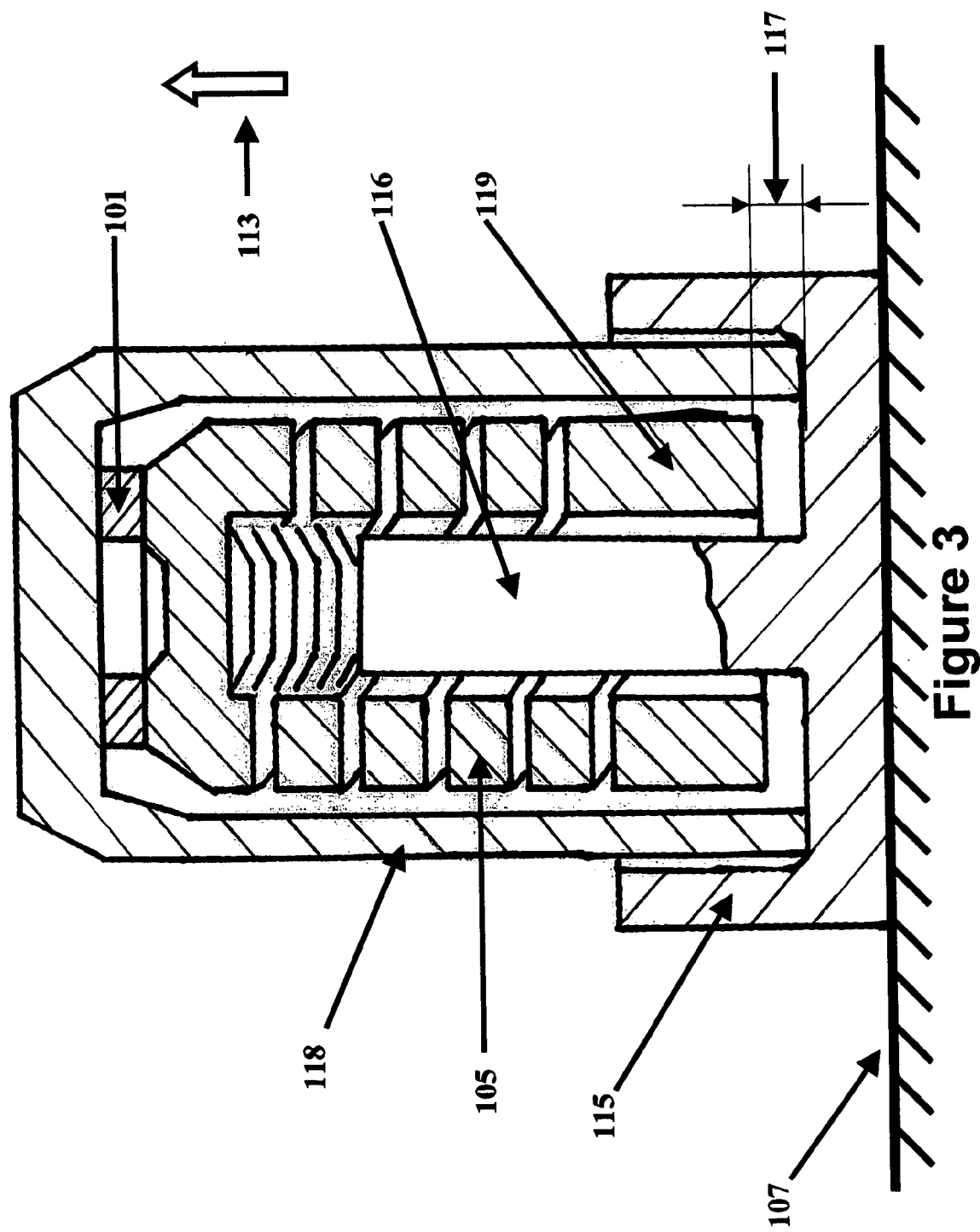
FIG. 3 illustrates a schematic cross section of a power generator according to a second embodiment.

In a second embodiment, as shown in FIG. 3, the power generator is very similar to that of the previous embodiment, with the difference being that the socket head cap screw 104 (FIG. 1) is eliminated, and the preloading of the piezoelectric element 101 is achieved by means of a pin 116, which is attached to or an integral part of a cap 115. The cap 115 is connected to the housing 118, for example by means of threads, potting, press fitting, flange or other methods known in the art. The cap 115 is in turn attached to the base structure using one of the means described in the previous embodiment. The gap 117, which allows vibration of the mass-spring unit as described for the previous embodiment is provided between the free end 119 of the spring 105 and the cap 115. In addition, the mass 109 is preferably eliminated and a required mass is added to the free end 119 of the spring by making it larger. Alternatively, and if it is allowed by the size of the power generator, the hole 110 in the mass 109 (FIG. 1) is made large enough to accommodate the pin 116. The hole 110 must obviously be large enough to allow vibration of the mass-spring unit without the interference of the pin 115. This embodiment has the advantage of eliminating the possibility of failure of threads of the screw 104 as a result of high firing accelerations or fatigue during vibration, and the possibility that the screw loosening up as a result of acceleration and decelerations and vibration of the mass-spring unit.

Figure 4:
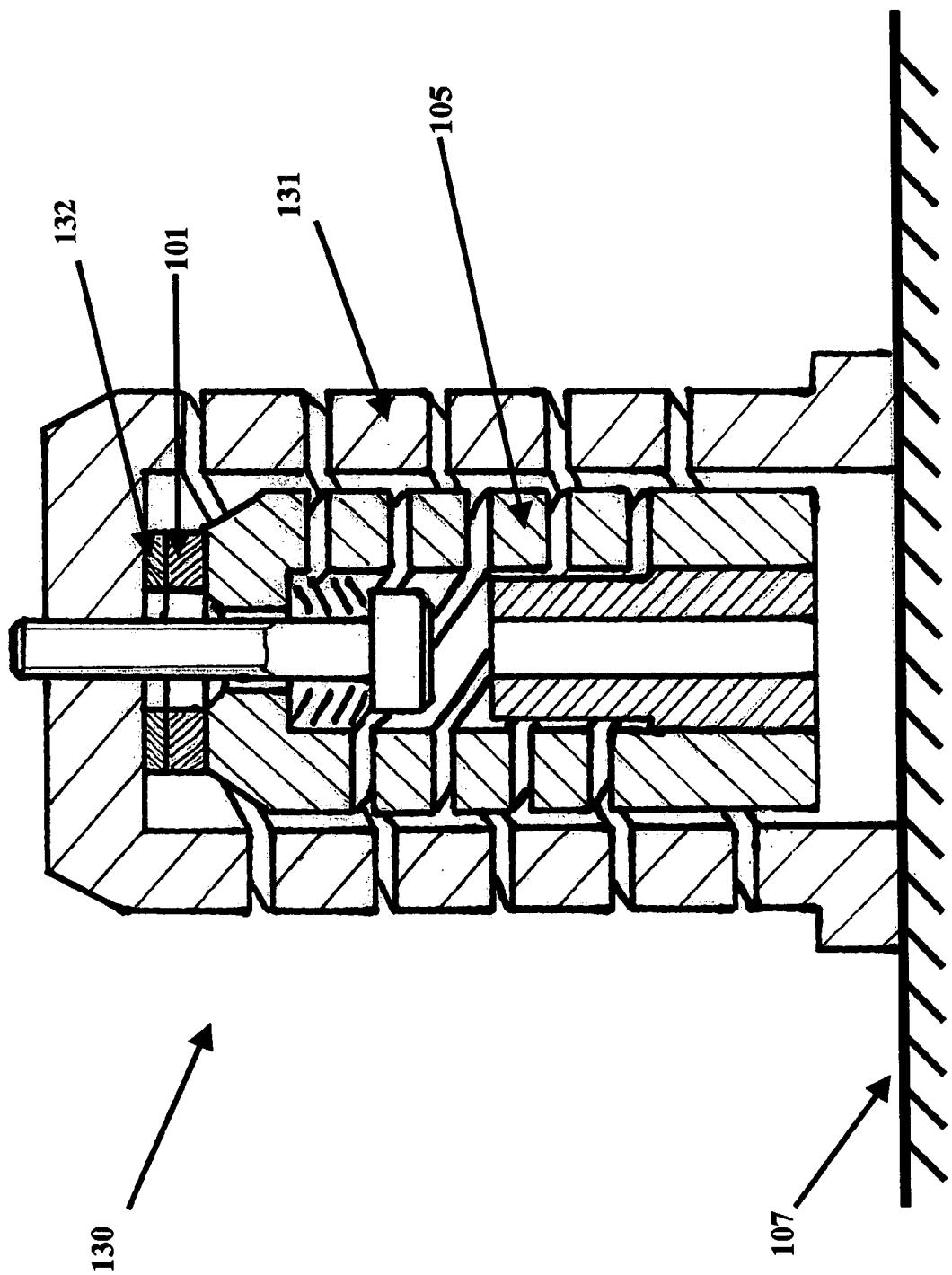
FIG. 4 illustrates a schematic cross section of a power generator according to a third embodiment.

In a third embodiment, as shown in FIG. 4, the power generator is very similar to that of the first embodiment, with a difference being that the housing 131 is provided with a significant flexibility in the axial direction, i.e., along the length of the housing 131. In FIG. 4, the housing 131 is shown as a helical spring (preferably with three or more strands). However, any other housing design that provides the desired axial flexibility may also be used. By providing a housing that is flexible in the axial (parallel to the spring 105) direction, the electric power generator 130 has the ability to collapse in the axial direction due to the firing acceleration and limiting the stretching of the spring 105. By making the housing spring 131 much stiffer than the spring 105, the electric power generator 130 can still vibrate and generate electricity at lower acceleration levels and collapse and protect the spring 105 and the piezoelectric element at extremely high accelerations. In FIG. 4, a washer 132 is shown to be positioned between the piezoelectric element and the housing 131. Such washers are preferably bonded to one or both surfaces of the piezoelectric element 101 to better distribute load over its top and bottom surfaces.

In the embodiment shown in FIG. 4, the housing 131 is providing the axial flexibility that is desired in the axial direction. Alternatively, the pin 116 (FIG. 3) may be provided with the desired axial flexibility while keeping the housing 131 rigid.

Figure 5A:
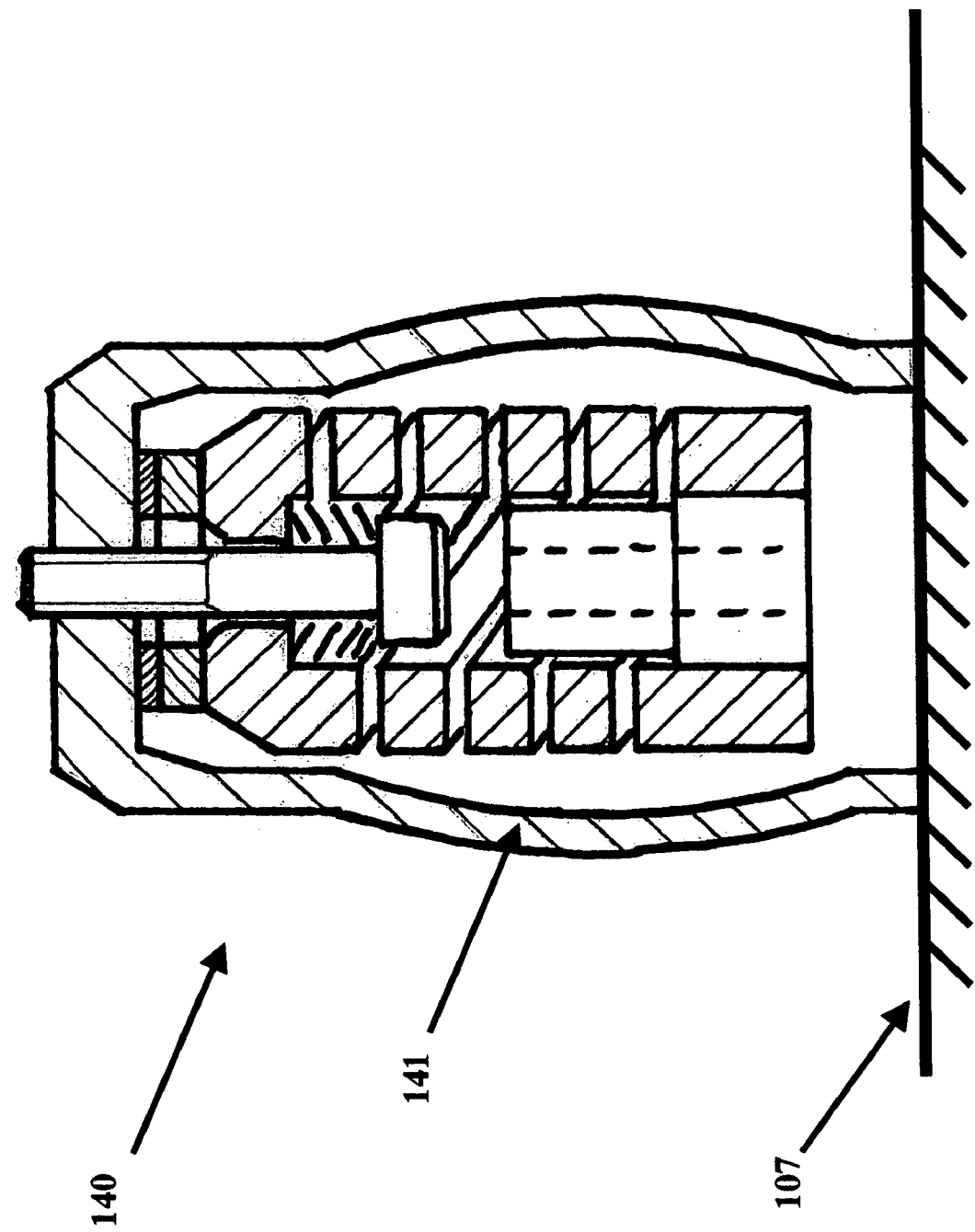
FIG. 5a illustrates a schematic cross section of a power generator according to a fourth embodiment.

In a fourth embodiment, as shown in FIG. 5a, the housing shell or support (frame) structure 141 is designed to buckle when the firing acceleration increases beyond a certain predetermined range, thereby helping to provide added protection against damage to the piezoelectric and/or mass-spring and/or other elements of the power generation unit 140. The housing shell or support structure 141 may be designed to be prone to buckling instability in any of the ways known in the art. In FIG. 5a, the buckling instability of the power generator 140 is due to a bowed geometry in its housing shell or support structure 141. At low accelerations and during vibration of the mass-spring unit, the instability will not be noticeable. However, if the acceleration exceeds a critical value, the housing shell (support structure) 141 will become unstable and buckle. The buckling of the housing shell or support structure 141 can be designed to provide protection for the mass-spring unit, piezoelectric element, assembly screw and other elements of the assembly from excessive loading. The buckling may be limited to its elastic range, in which case the housing shell or support structure returns to its original shape once the critical acceleration level has subsided. Alternatively, the housing shell or support structure could be designed to permanently deform during buckling. The housing shell or support structure could also be designed to achieve a combination of elastic and plastic deformation.

In either one of the above cases, the total amount of buckling deformation must be limited to prevent a total collapse of the housing shell or support structure during high acceleration (firing) periods and excessive loading of the piezoelectric and/or the mass-spring and/or the assembly screw or other elements of the assembly. In addition, the total amount of buckling deformation must be limited to prevent a total and permanent collapse of the housing shell or support structure, in order to allow the mass-spring unit to vibrate with the desired amplitude following the high acceleration period(s).

Figure 5B:
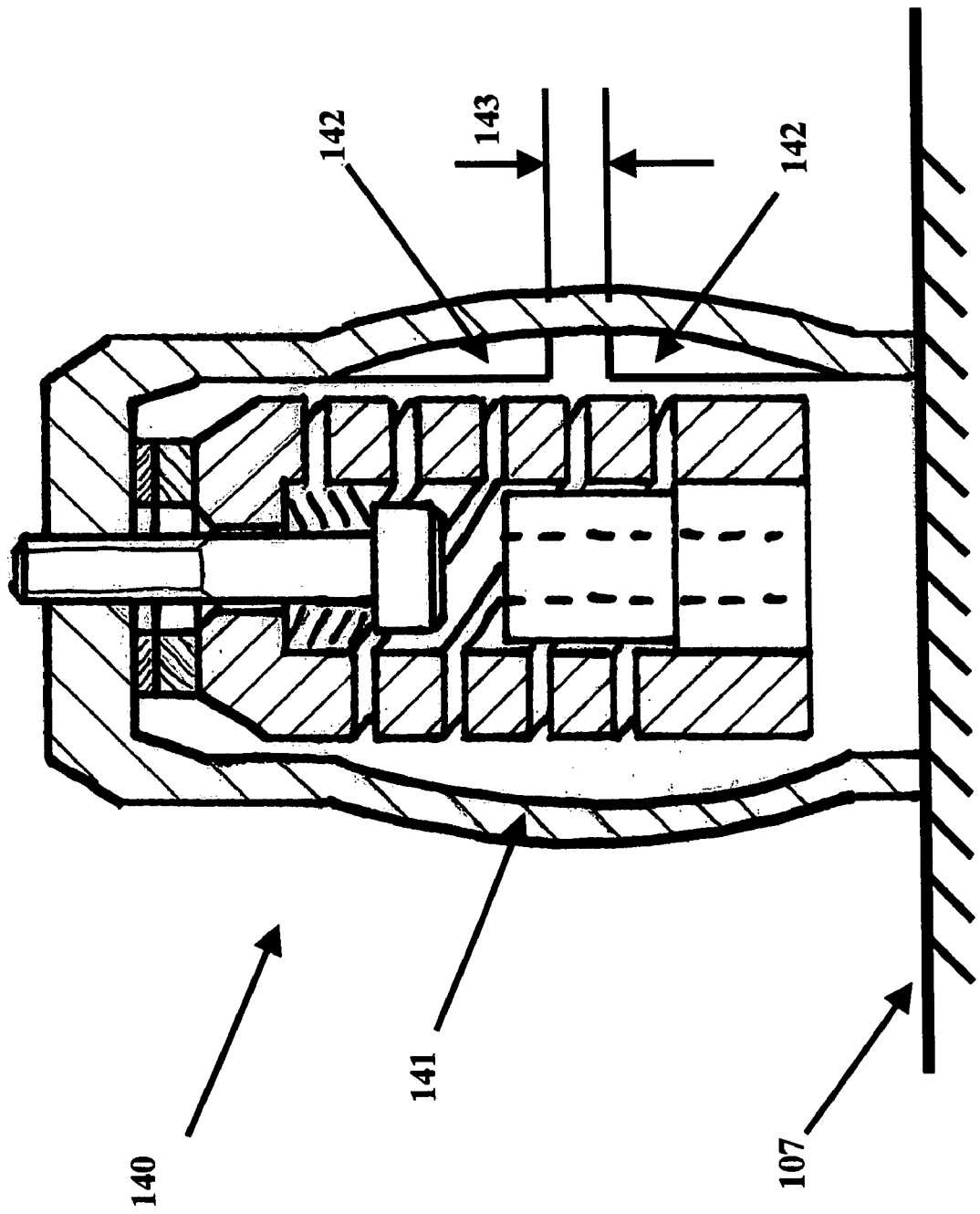

The means of limiting the maximum buckling deformation of the housing shell or support structure 141 may be an integral part of the housing shell or support structure as shown in FIG. 5b. In the embodiment of FIG. 5b, the housing shell or support structure is provided with pairs of axially positioned steps 142 (preferably three or more that are positioned symmetrically around the periphery of the housing shell or support structure) are used to limit the axial buckling of the housing shell or support structure 141 to the provided gap 143. The steps 142 may be internal and/or external to the housing shell or support structure 141. The steps 142 are preferably integral to the housing shell or the support structure.

Figures 5C, 5D:
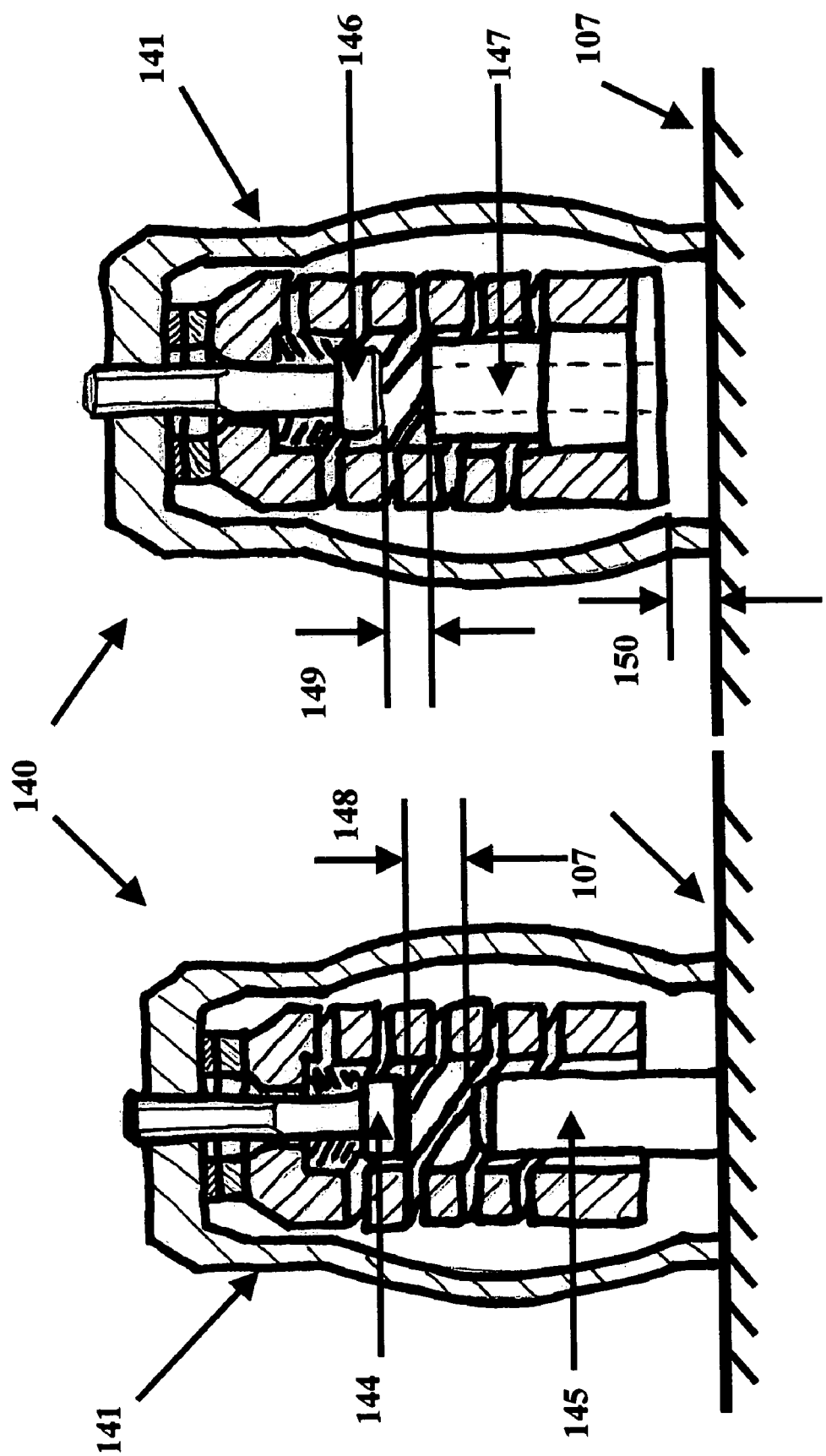

Alternatively, the means of limiting the maximum buckling deformation of the housing shell or the support structure 141 may be provided by a space 148 between a head of the assembly screw 144 and a pin 145 attached to the base structure 107 as shown in FIG. 5c (the pin may also be attached to the housing shell or the support structure base 141, not shown).

Alternatively, the means of limiting the maximum buckling deformation of the housing shell or the support structure 141 may be provided by a space 149 between the head of the assembly screw 144 and the mass 147 (of the mass-spring unit) and the space 150 between the mass 147 and the base structure 107 as shown in FIG. 5d (the space 150 may also be between the mass 147 and the base of the housing shell or the support structure 141, not shown).

Alternatively, the means of limiting the maximum buckling deformation of the housing shell or the support structure 141 may be provided by a space 152 between the head of an assembly screw 151 and the base structure 107 as shown in FIG. 5e (the space 152 may also be between the head of an assembly screw 151 and the base of the housing shell or the support structure 141, not shown).

Figure 5F:
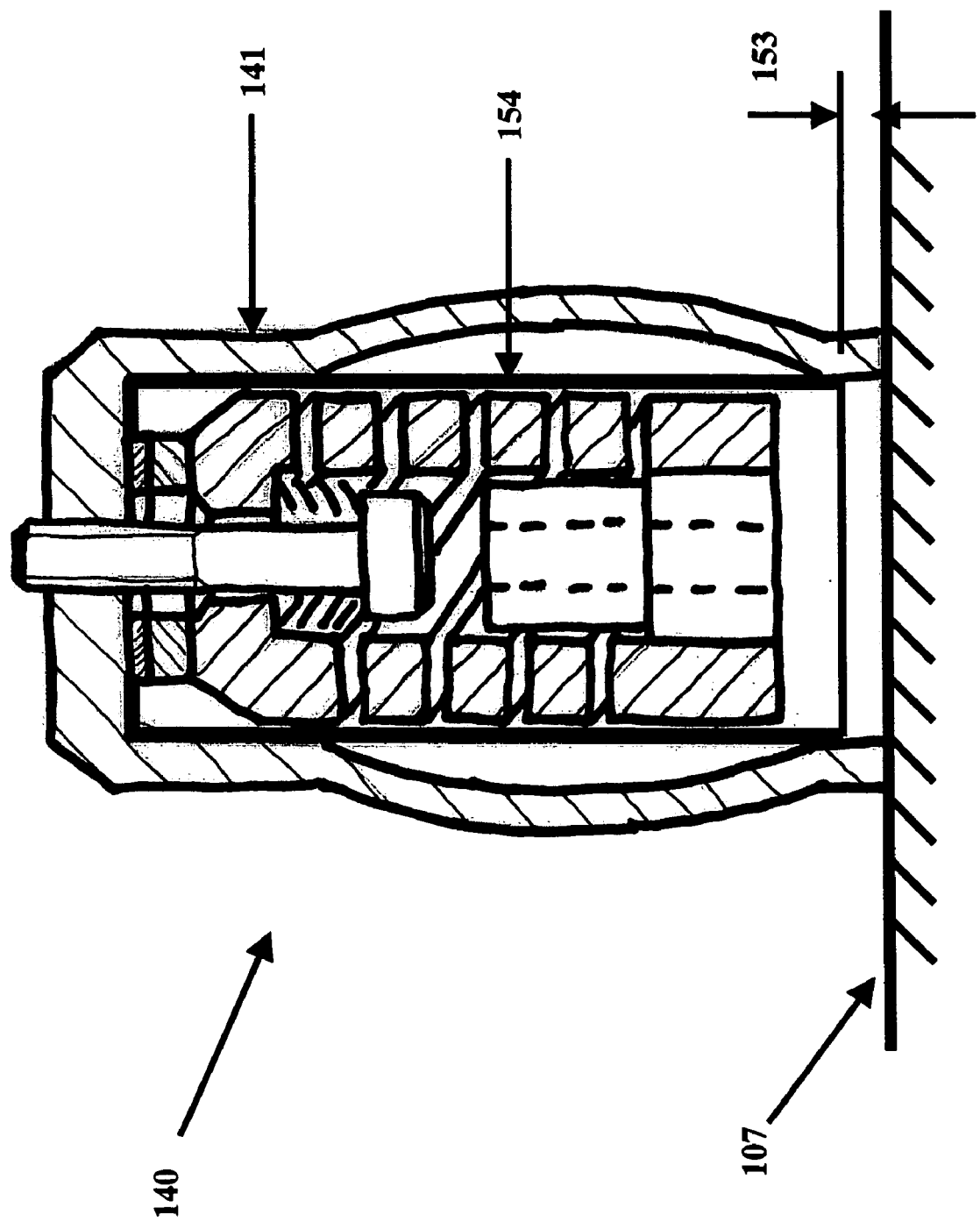

Alternatively, the means of limiting the maximum buckling deformation of the housing shell or the support structure 141 may be provided by a space 153 between a cylindrical sleeve 154 and the base structure 107 as shown in FIG. 5f (the space 153 may also be between the sleeve 153 and the base of the housing shell or the support structure 141, not shown). In FIG. 5f, the sleeve 154 is shown to be press fitted into the top portion of the housing shell or support structure 141. Alternatively, the sleeve 154 may be press fitted to the bottom portion of the housing shell or support structure 141 or even be loosely assembled inside of the housing shell or support structure 141.

Figure 5G:
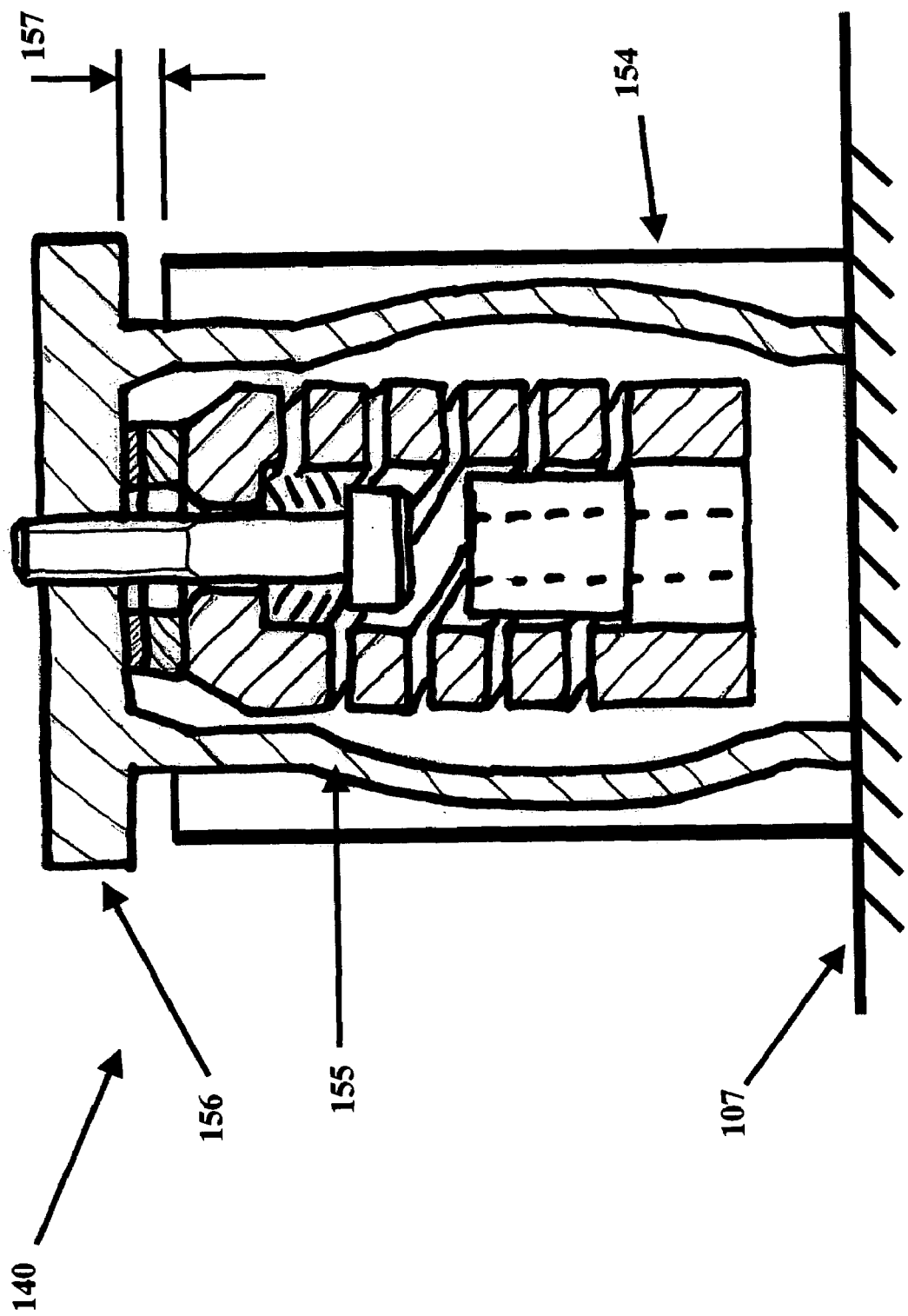

Alternatively, the sleeve 154 may be positioned exterior to a housing shell or support structure 155 that has a top flange 156 as shown in FIG. 5g, and limit its maximum buckling by either the space 157 between the flange 156 and the sleeve 154 or by limiting the outward radial expansion of the housing shell or support structure 155.

In the FIGS. 5a-5g, the buckling under high (firing) acceleration is shown to be in the housing shell or the support structure (columns of a support structure frame) in the axial direction. However, the buckling may be designed to occur in other modes, and in other elements of the structure of the power generation assembly. For example, the pin 116 of the embodiment shown in FIG. 3 may be designed to buckle in the elastic range to reduce the peak loading of the piezoelectric element 101 during peak acceleration period(s), and return to essentially its original shape and position to allow unhindered operation of the power generator.

In other apparatus and methods disclosed herein, a mass-spring unit is attached directly or via an intermediate element to the base structure. A piezoelectric element is positioned between the spring of the mass-spring unit and the base structure or between the mass-spring unit and an intermediate element. The means of attaching the spring of the mass-spring unit to the base structure (or the aforementioned intermediate element) is preferably provided with the means to preload the piezoelectric element in compression so that during the vibration of the mass-spring unit, the piezoelectric element is not subjected to tensile loading. When an intermediate element is present, it may be attached directly to the base structure by any one of the methods commonly used in the art, e.g., by constructing the intermediate element as a cylinder and threading it and the base structure; or by using screws or bonding using various methods known in the art, including adhesives; by providing a flange on the intermediate element and then attaching the flange to the base structure using methods known in the art, including the use of clamps; etc.

An advantage of this method is that it leads to designs that are very simple and easy to manufacture, assemble and mount on the base structure. However, a disadvantage of this method is that during acceleration of the base structure (in the axial direction), the force generated by the entire mass of the mass-spring unit, the attachment means (e.g., screw), the preloading means (e.g., Belleville washers), etc., act directly on the piezoelectric element. As a result, the piezoelectric element has to be designed to resist the maximum possible (shock) loads, thereby leading to a power generator that is difficult to be optimally designed for the actual (working) acceleration levels of the base structure and produce the maximum possible power for a specified (available) power generator volume. This shortcoming of the present method can, however, be substantially overcome using a number of modifications that are described in the following embodiments.

Figure 6:
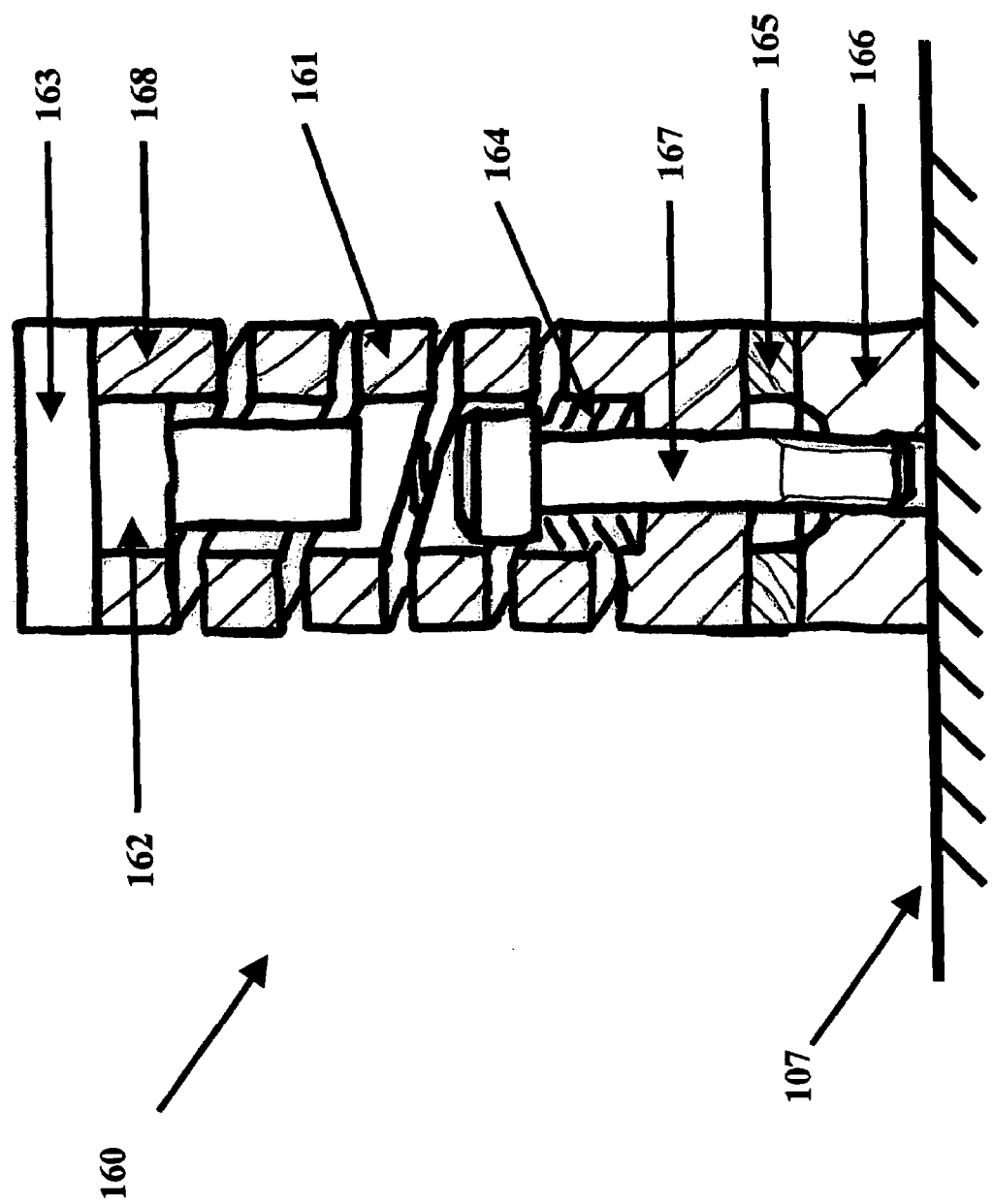
FIG. 6 illustrates a schematic cross section of a power generator according to a fifth embodiment.

A schematic of the fifth embodiment 160 is shown in FIG. 6. The unit 160 primarily consists of a spring 161, preferably made of 3 or more helices to minimize bending and other rotations and lateral displacement during vibration; mass 162, which may have a top piece 163 to prevent it from traveling into the spring element 161, and noting that the free (top) portion 168 of the spring 161 may partly or wholly constitute the mass 162 and 163; and a piezoelectric element 165. The mass 168 is preferably press fitted and/or potted into the open end of the spring 161. A screw 167 is used to attach the spring 161 to an intermediate element 166, with the piezoelectric element 165 being positioned between the two. One or more stacks of Belleville washers 164 are positioned between the screw head and the spring 161 to provide the required preloading force on the piezoelectric element 165. The preloading load is adjusted by adjusting the tightness of the screw 167. The intermediate element 166 may then be attached to the base structure 107 using any one of the aforementioned means, including by a longer assembly screw 167 that taps into the base 107.

In an alternative embodiment of the electrical power generator 160, the intermediate element 166 can be eliminated and the piezoelectric element can be attached directly to the base structure 107.

The embodiment 160 provides a very simple design, which, however, does not offer any protection for the piezoelectric 165 against excessive high accelerations of the base structure. The spring 161 is preferably designed such that during firing it is compressed until it reaches its solid height, which indicates the total potential energy that is stored in the spring 161. Once the firing (high) acceleration period has ended, the spring-mass unit is free to oscillate. Meanwhile the mechanical energy stored in the spring element 161 can be converted into electrical energy by the piezoelectric element.

In yet other methods and apparatus disclosed herein, a mechanical mechanism is provided to limit the deformation of the spring element of the mass-spring units in compression, tension or both tension and compression. The purpose of such spring deformation limiting mechanisms is to limit the compressive and/or the tensile loading applied to the piezoelectric elements and also prevent overloading of the spring element when the base acceleration and/or deceleration passes certain limits. The embodiments of this method are otherwise similar to those presented for the fifth embodiment.

Figure 7:
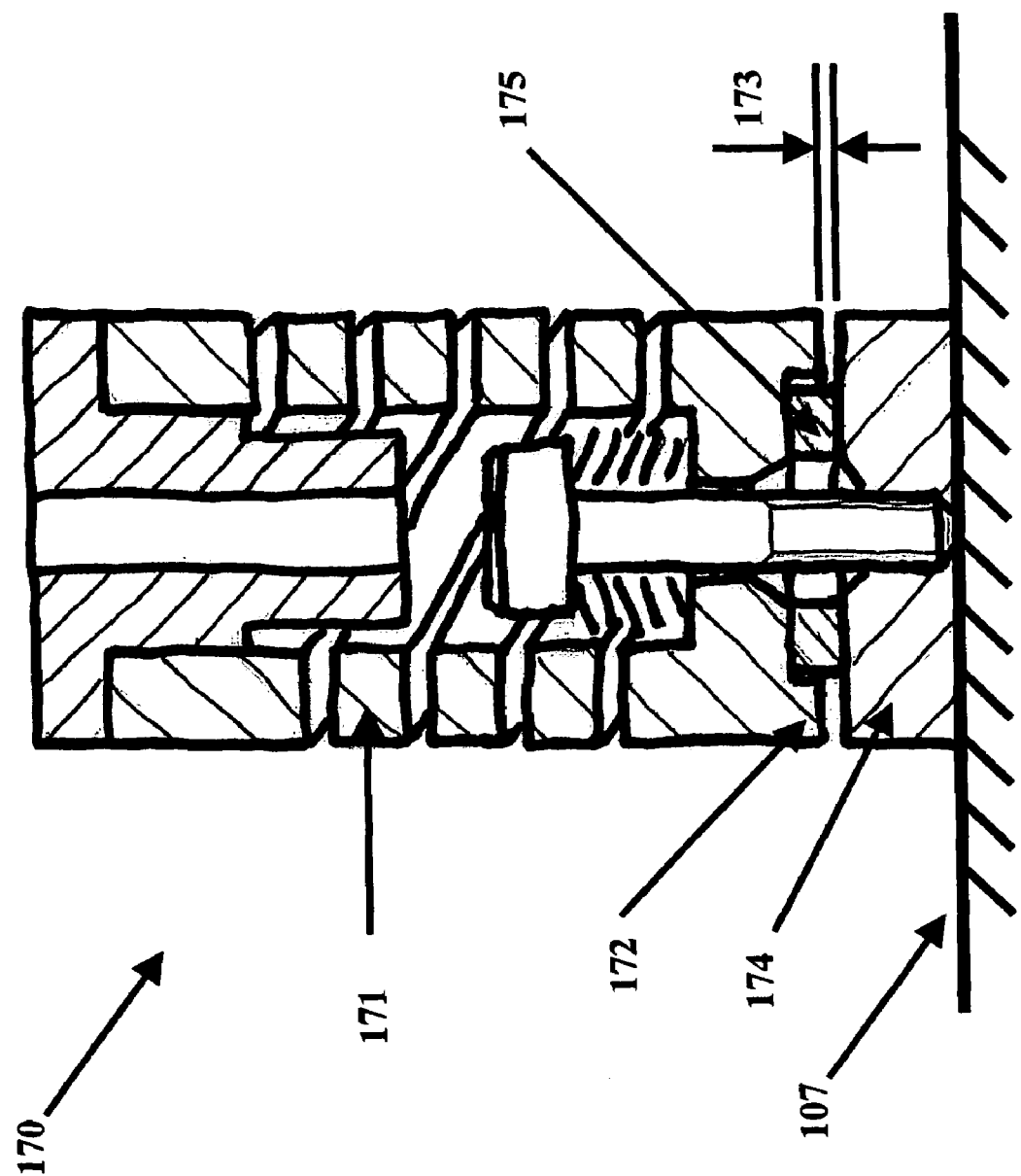
FIG. 7 illustrates a schematic cross section of a power generator according to a sixth embodiment.

A sixth embodiment, generally referred to by reference numeral 170, is shown in FIG. 7. The power generator 170 of the sixth embodiment is very similar to the previous embodiment 160, with the addition of a protective stop 172 located around a base of the spring 171. The stop 172 is designed to bottom out against the intermediate element 174, closing the gap 173, if the vertical acceleration of the base structure 107 exceeds a specified level. As a result, by proper selection of the amount of the gap 173, the piezoelectric element 175 is protected from overloading in compression. The gap 173 must still be large enough to allow the piezoelectric generator 175 to deform during the oscillations of the spring 171.

For a realistic thickness of the piezoelectric stack 175, for example for heights of around 5 mm, the gap 173 needs to be less than 10 microns, depending on the level of the working acceleration, which requires precision manufacture of the spring element or employment of a simplifying manufacturing/assembly technique. As an example, the gap 173 may be made larger than required without requiring high precision, then during the assembly, the gap 173 is filled with hard epoxy, while taking steps to allow the epoxy to bond to only one of the surfaces of the gap 173. The unit is then loaded in compression to the desired compression limit of the piezoelectric element and the epoxy is allowed to cure. This assembly procedure ensures that the desired gap height is achieved.

Figure 8:
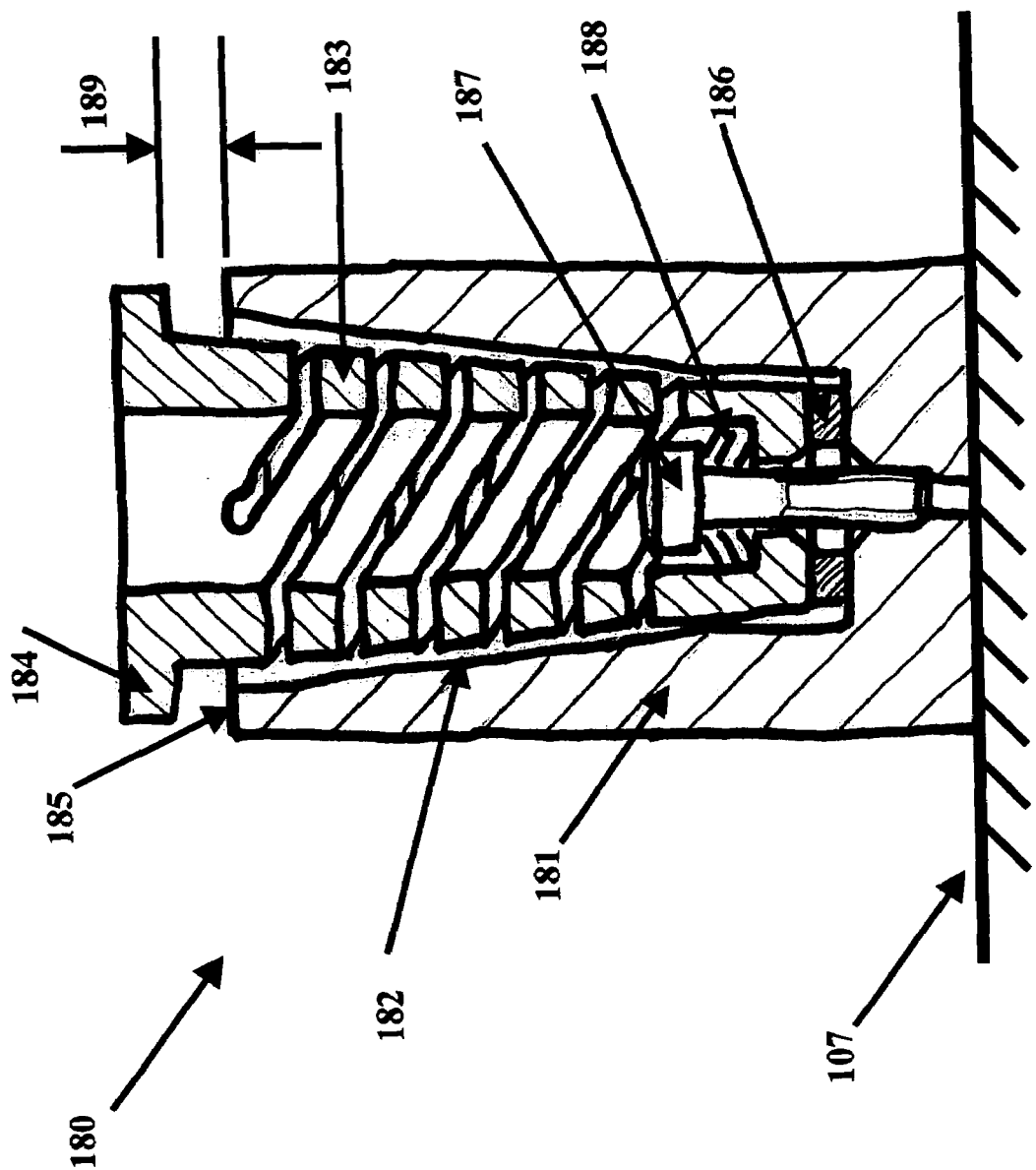
FIG. 8 illustrates a schematic cross section of a power generator according to a seventh embodiment.

A seventh embodiment is similar to the embodiment of FIG. 7, with the difference being in the method of stopping the spring element against the intermediate element. The schematic of such an embodiment 180 is shown in FIG. 8. The spring element 183 is made with a tapered outer diameter, while the intermediate element 181 is provided with a matching tapered surface 182. As the base structure 107 accelerates upward, e.g., during firing by a gun, the spring 183 begins to compress, until it comes to rest against the tapered surface 182 of the intermediate element 181 when a specified acceleration level is reached. If the acceleration of the base structure exceeds the specified level, the contacting tapered surfaces prevent overloading of the piezoelectric element 186, and also protects the spring element 183 from excessive deformation axially and in other modes such as bending or lateral displacement, thereby protecting it from failure. Similar to the previous embodiments, the spring element 183 is attached to the intermediate element 181 with the screw 187 and with the Belleville washers 188 to provide the means to preload the piezoelectric element for its protection from tensile loading during vibration of the mass-spring unit. The intermediate element 181 is in turn attached to the base structure 107 using one of the means previously described. This embodiment therefore provides protection against over-stressing of both the spring element 183 and the piezoelectric element 186.

In a variation of the seventh embodiment, the spring element 183 is also provided with a top flange 184. In the absence of the acceleration of the base structure 107, a gap 189 is provided between the flange 184 and a top surface 185 of the intermediate element 181. When the acceleration of the base structure 107 reaches a certain specified level, the spring 183 is compressed enough to close the gap 189, thereby preventing the top flange 184 of the spring element to move down any further. As a result, the maximum compressive load of the piezoelectric element 186 can be limited, thereby providing the means to protect it from failure.

In another alternative of the seventh embodiment, no taper is provided on either the spring element 183 or the intermediate element 181. The spring element is provided with the flange 184, FIG. 8, which comes to a stop against the top 185 of the intermediate element 181 at a specified level of the acceleration of the base structure 107, thereby providing protection for both the piezoelectric element 186 and the spring 183.

Figure 9:
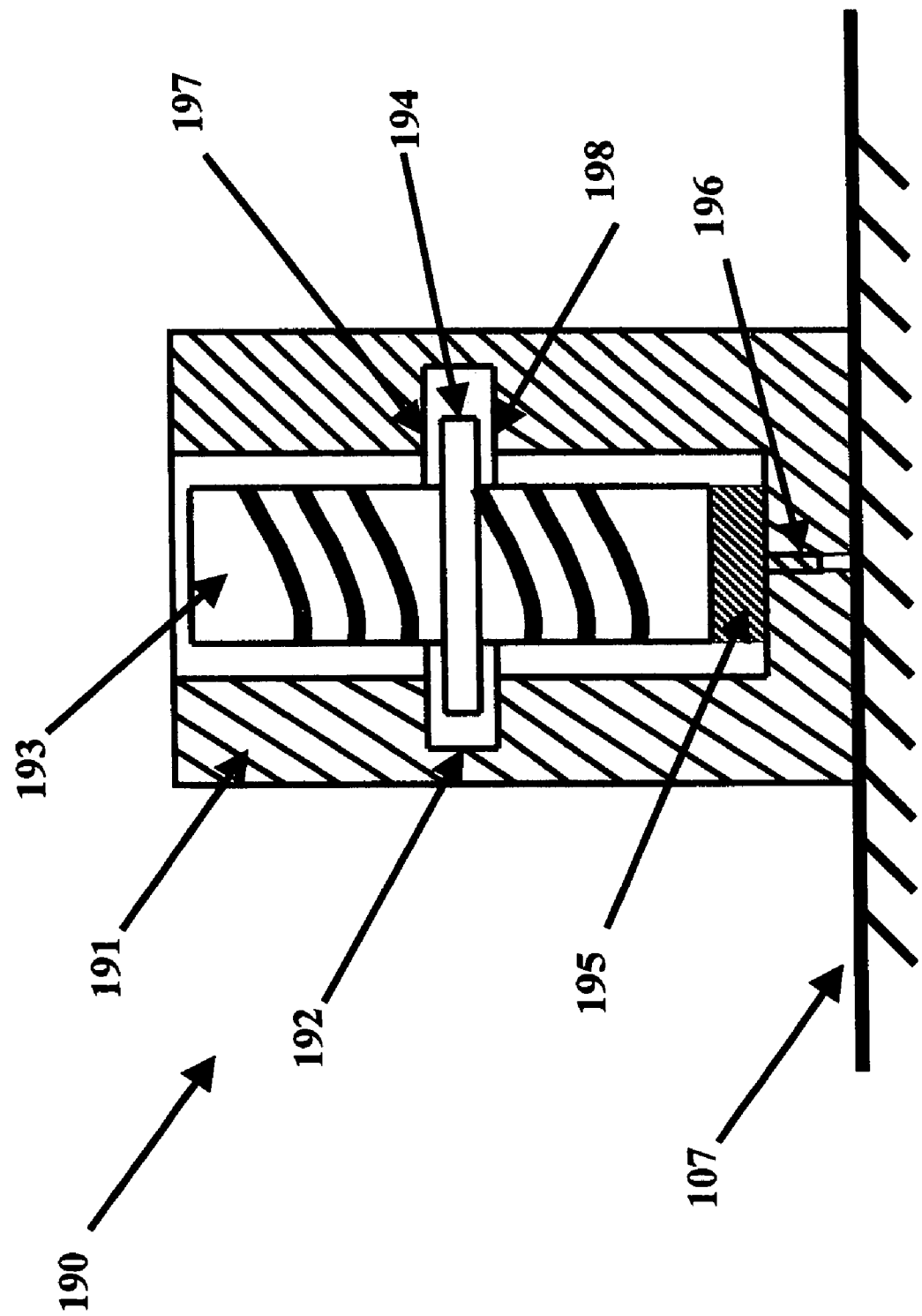
FIG. 9 illustrates a variation of the power generator of FIG. 8.

In another alternative of the seventh embodiment, the spring flange 184 can be positioned along the length of the spring. Such an embodiment 190 is shown in FIG. 9. The intermediate element 191 of this embodiment is shown to have an internal groove 192, in which the flange 194 of the spring element 193 is positioned. The flange 194 may be an integral part of the spring 193, in which case to make the unit assembly possible, either the intermediate element has to be made out of two parts with a common surface at the groove 192 (the two parts, longitudinal or transverse, have to be then joined using any one of the methods known in the art); or the flange 194 may be a retaining ring, which is assembled in a groove (not shown) in the spring 193. The spring element 193 is then attached to the intermediate element 191 by a screw 196 as shown for the previous embodiments, with the piezoelectric element 195 positioned between the two as shown in FIG. 9. Preloading Belleville washers (not shown) are preferably used with the screw 196 as shown in FIG. 8. As can be appreciated, the total axial compressive and tensile deformation of the spring is thereby protected at high accelerations and decelerations of the base structure 107. The total amount of compressive and tensile deformation of the spring is determined by the gaps 198 and 197, respectively, between the lower and upper surfaces of the flange 194 and the lower and upper surfaces of the groove 192. The piezoelectric element 195 and the spring element 193 are thereby protected from overloading due to high levels of base structure acceleration and deceleration.

Figure 10:
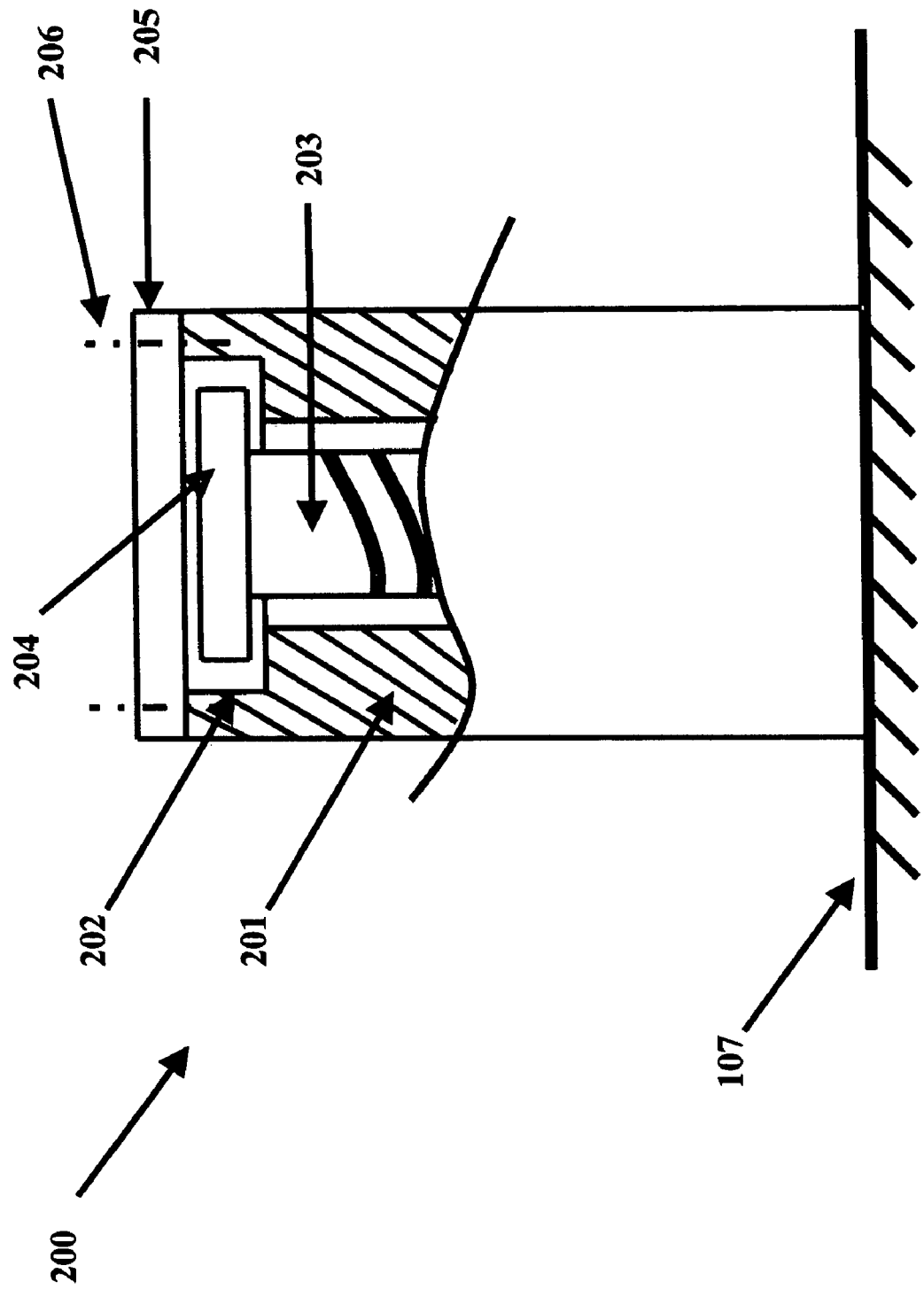
FIG. 10 illustrates a variation of the power generator of FIG. 9.

In a variation of the embodiment shown in FIG. 10, the spring element 203 has a flange 204 at its free (upper) end. The intermediate element 201 is the provided with a counter bore 202, in which the flange 204 is positioned in the assembled unit 200. A cap 205 is then fixed to the top of the intermediate element 201, for example by screws 206 (shown schematically by dashed lines). The remaining elements of this embodiment are the same as those of the embodiments shown in FIGS. 8-9. The flange 204, thereby, protects both the piezoelectric element and the spring element 203 as was described for the previous embodiment.

In the embodiments shown in the FIGS. 8-10, the spring deformation limiting taper surfaces and spring flanges are positioned external to the spring element. Alternatively, the taper surfaces and/or flanges may be positioned internal to the spring, with the mating taper surfaces and/or flange accommodating grooves positioned on an internal pin (such as a pin similar to the pin 151 in the embodiment of FIG. 5e, with an external taper surface and/or groove used in place of the screws 187 or 196 in the embodiments of FIGS. 8-10).

In the embodiments shown in FIGS. 9 and 10, the spring deformation limiting flanges are provided on the spring elements and the mating grooves are provided on the intermediate elements. Alternatively, the flanges may be provided on the intermediate elements and the mating grooves on the spring elements.

In all the above embodiments of this method, one part of the spring deformation limiting mechanism (for example a groove or its mating flange, or one of the tapered mating surfaces) is provided on the intermediate element, which is in turn fixedly attached to the base structure. It is, therefore, possible for the intermediate element to be an integral part of the base structure.

In still yet further apparatus and methods disclosed herein, double spring-mass (mass positioned in between two springs) unit(s) are packaged such that: (a) there is no need for separate preloading elements; (b) the internal attachment screws or the like are eliminated; (c) fewer internal components are needed; and (d) the assembly process is greatly simplified and the need for a preload adjustment step is eliminated. The electric power generators using this method can be constructed with three basic parts; a double spring and mass unit, which can be constructed as a single integral unit; piezoelectric generator(s); and an outer (or inner) support structure, which may be in the form of a shell housing. In this method, the mass-spring unit is compressed and positioned within a gap provided with a relatively rigid housing shell or support structure. Piezoelectric elements are positioned between at least one of the springs and the gap surfaces. The unit is then attached to the base structure using one of the methods described for the previous embodiments.

Figure 11:
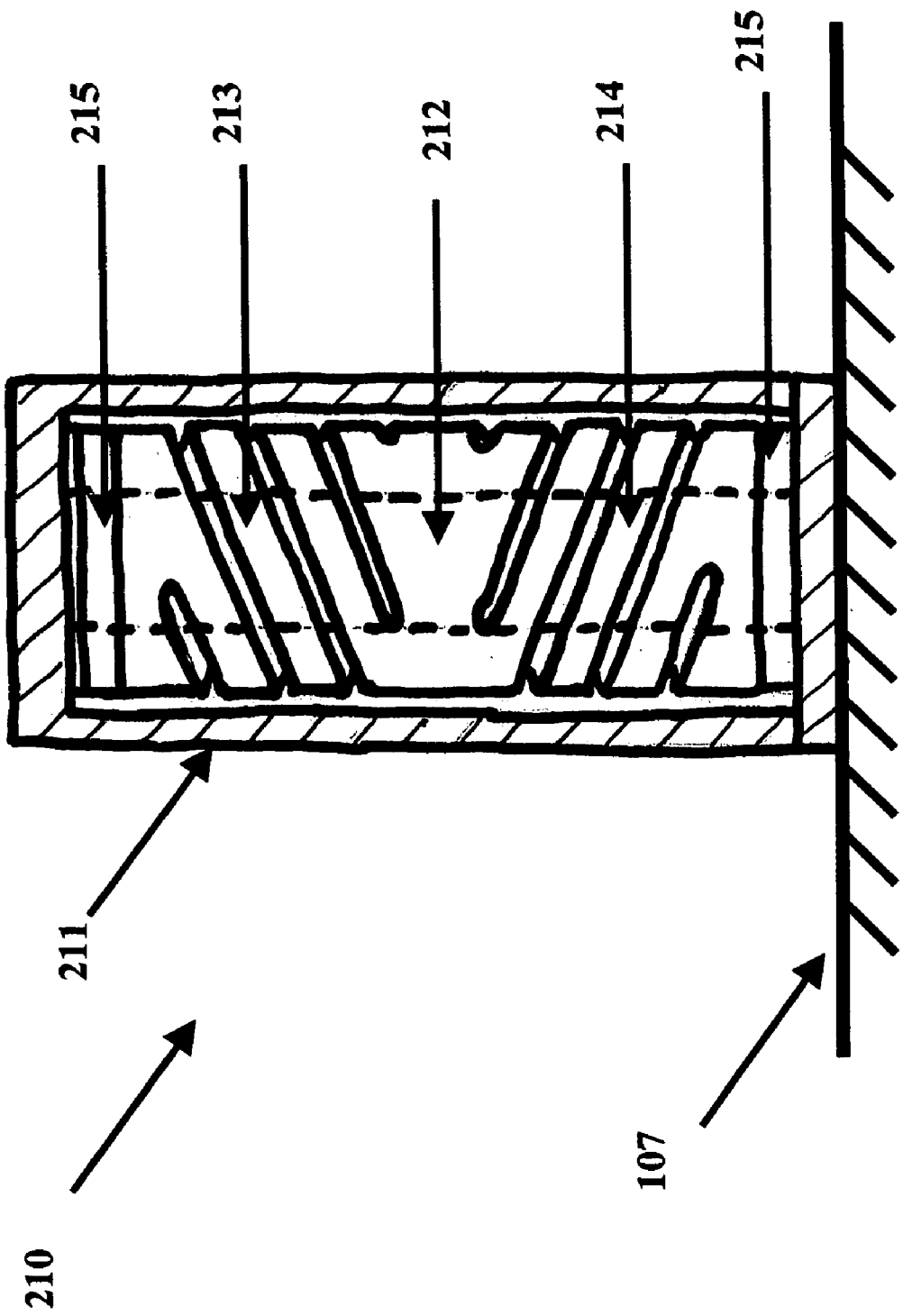
FIG. 11 illustrates a schematic cross section of a power generator according to a eighth embodiment.

A schematic of an eighth embodiment 210 is shown in FIG. 11. It comprises a mass 212, which is positioned between two springs 213 and 214. In FIG. 11, the mass 212 and the two springs 213, 214 are constructed as a single unit, however, they may also be individual components. The mass-spring unit is then positioned inside a relatively rigid shell housing 211. Piezoelectric elements 215 are placed between each spring 213, 214 and the housing on one or both ends. In the embodiment shown in FIG. 11, the opening through which the mass and spring unit and the piezoelectric elements 215 are entered into the housing shell 211 is positioned on a side of the housing shell 211. Alternatively, all internal elements may be entered from a top or bottom opening, and then sealed by a cap. When the loading opening is on the bottom of the housing, which is directly attached to the base structure 107, no cap may be required.

The mass 212 or the spring elements 213 and/or 214 (preferably only one of the two) can be provided with a flange similar to the flange 194 in FIG. 9, and the housing shell can be provided with a mating groove 192 (alternatively, the position of the flange and the mating groove may be exchanged). As a result, the total deformation of the springs, thereby the compressive and tensile force exerted on the piezoelectric element(s) is limited. This provides protection for both piezoelectrics 215 and the spring elements 213, 214 when the acceleration or deceleration of the base structure 107 exceeds the specified amount.

The spring 213 and/or spring 214 can be provided with outside taper and mating taper surfaces on the inner surfaces of the housing shell, both similar to that shown in FIG. 8. As a result, the compressive and/or tensile deformation of the springs 213 and 214 is/are limited. This provides protection for both piezoelectric 215 and the spring elements 213, 214 when the acceleration or deceleration of the base structure 107 exceeds the specified amount.

Instead of an exterior shell housing or support structure, an interior structure can be used to keep the distance between the top surface of the interior assembly (top surface of the spring or the piezoelectric element, if any) and the bottom surface of the interior assembly (bottom surface of the spring or the piezoelectric element, if any) relatively constant.

Figure 12:
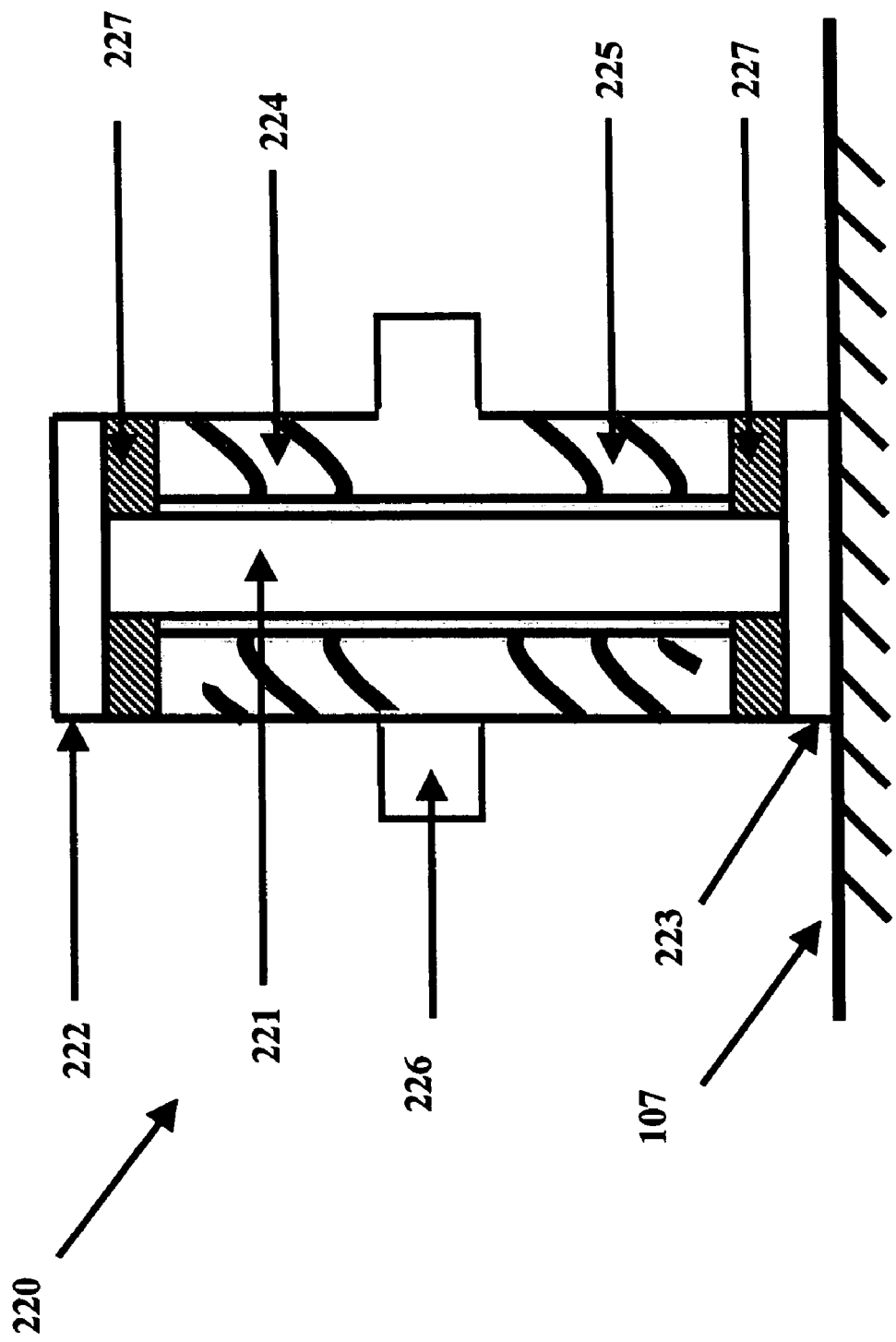
FIG. 12 illustrates a variation of the power generator of FIG. 11.

The schematics of a typical such embodiment 220 is shown in FIG. 12. The support structure is shown as a cylinder 221, with top 222 and bottom 223 ends (one of the ends 222 or 223, alone or with certain portion of the cylinder 221, is a separate piece and is fastened to the main piece to allow assembly). Two springs 224 and 225, with a mass 226 that is positioned between the two springs are assembled as shown around the interior cylinder 221. The mass and the two springs are preferably constructed as a one integral piece. Piezoelectric elements 227 are positioned on at least one side of the mass and spring unit. The spring is preferably preloaded to prevent the piezoelectric element(s) from being loaded with a considerable tensile loading to prevent its failure.

In the above embodiments, the springs are preloaded to prevent excessive loading of the piezoelectric elements in tension. Alternatively, by providing little or no preloading, and by firmly attaching the piezoelectric element(s) to the housing shell, the spring is allowed to bounce back and forth inside the housing shell cavity. The advantage of such a design is that the piezoelectric elements are never subject to tensile loads, which can easily fracture such brittle materials. However, the resulting impact loading can cause problems. In addition, the impulsive loading of the piezoelectric element(s) result in high but short duration charges that has to be harvested rather quickly, which can be difficult to accomplish efficiently.

In still yet other apparatus and methods disclosed herein, the piezoelectric based power generators are constructed with two modular units. The first module is a mass-spring unit and the second module is a packaged preloaded and high acceleration and shock resistant piezoelectric unit. The two modules are then connected to each other by a screw or by using any one of the methods known in the art.

The spring of the mass-spring unit is preferably designed such that it could compress essentially elastically to a solid length, thereby providing a means of protecting the spring from failure in compression. When necessary, relatively solid stops (provided by a housing shell or internal or external support structure) are preferably provided to limit tensile deformation (elongation) of the spring, thereby providing a means of protecting the spring from failure in tension. As a result, the spring of the mass-spring unit can readily be protected from excessive acceleration and/or deceleration of the base structure.

The piezoelectric unit (module) comprises a housing or support structure, within which the piezoelectric element is assembled with two sets of preloading springs (preferably of Belleville washer type), separated by a relatively solid separating element, to which the spring-mass module is attached. The piezoelectric element is positioned between the base of the housing and one of the two sets of preloading springs, opposite to the separating element.

By assembling mass-spring units with various equivalent masses and spring rates with various piezoelectric unit modules with appropriate preloads and piezoelectric elements, a wide range of power generator units that can operate in various acceleration/deceleration and shock loading environment and various power generation requirements can be constructed. When subjected to higher than operating base structure accelerations, the spring of the mass-spring can be made to come in contact with the piezoelectric unit housing or support structure, thereby preventing the piezoelectric from damage. When subjected to higher than operating base structure deceleration, the mass-spring unit pulls the aforementioned separating element away until it is stopped by the housing element. By having provided enough of a preloading force and by matching the deformation of the preloading springs to the allowed displacement of the separating element, the preloading spring stays in contact with the piezoelectric element at all times, thereby preventing any impact loading of the piezoelectric element during subsequent acceleration (or significant reduction in the deceleration level) of the base structure.

Figure 13:
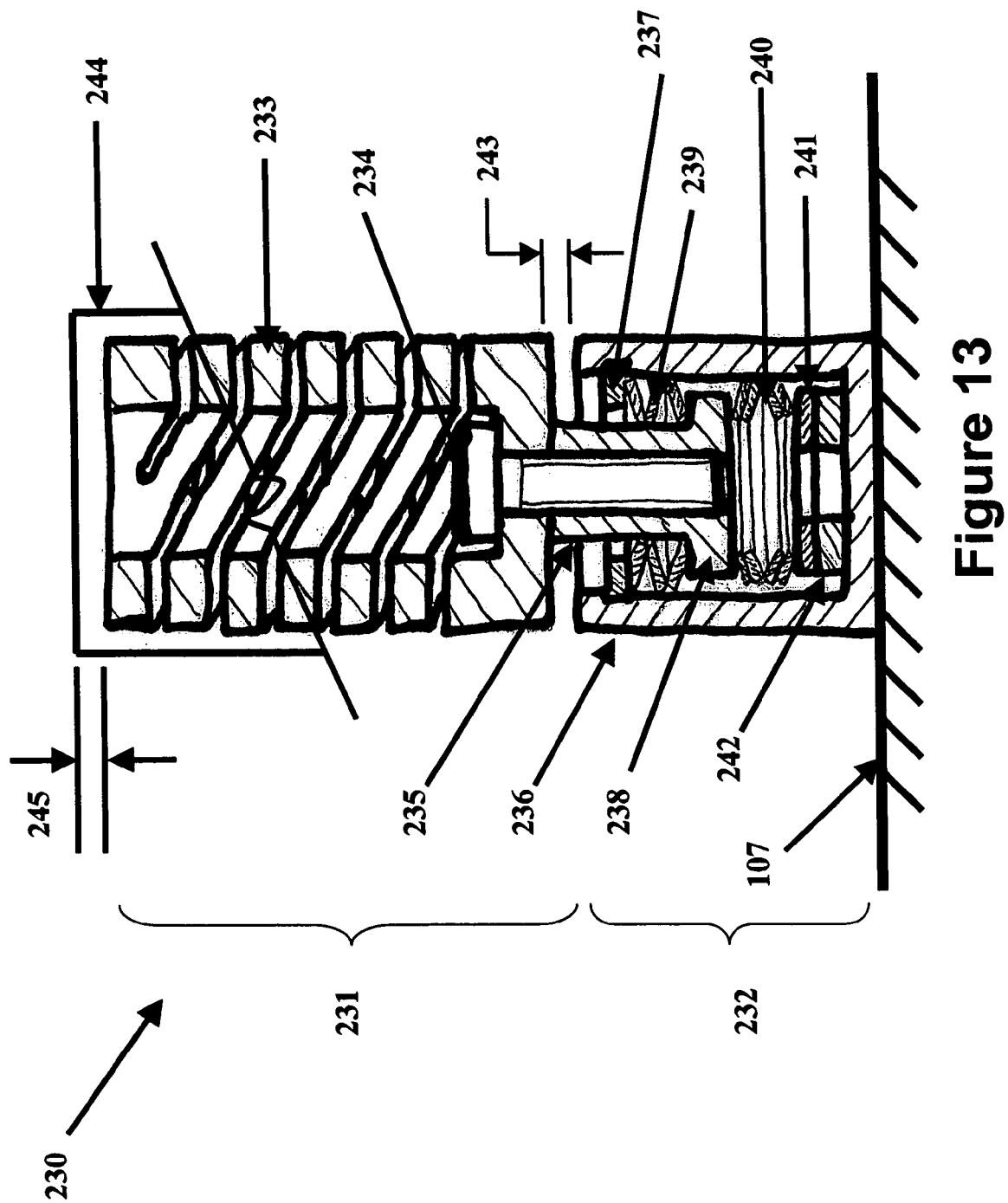
FIG. 13 illustrates a schematic cross section of a power generator according to a ninth embodiment.

A schematic of a ninth embodiment 230 is shown in FIG. 13, and comprises the mass-spring module 231 and a piezoelectric assembly module 232. In the schematic of FIG. 13, the mass of the mass-spring module is incorporated into the mass of the spring element 233. However, additional mass may also be added (preferably to the free end) of the spring element 233 to vary (decrease) the natural frequency of the mass-spring module 231. The two modules (231 and 232) are attached together by the screw 234. The two modules may be attached together in numerous ways known in the art. For example, a stem may be provided on the attaching side of the spring, which can then be press fit into a provided hole in the attachment element 235, or the stem may be threaded and screwed in a tap provided in the element 235, instead of the screw 234.

The piezoelectric assembly module 232 consists of a housing 236, at the bottom of which the piezoelectric 242 (preferably stack) element is positioned (preferably adhered by a relatively hard epoxy or other similar material to help to distribute the load more uniformly on the piezoelectric element surface at its interface with the housing 236). A washer 241 is positioned (preferably similarly adhered) to the piezoelectric element 242. The separating element (plunger) 238 with at least one preloading (preferably of Belleville washer type) springs 239 and 240, above and below its flange 238, respectively, is positioned above the piezoelectric washer 241. The preloading springs 239 are held in place by the retaining ring 237. To prevent the retaining ring 237 from being dislodged during impact loading or high acceleration/deceleration of the base structure, a sleeve (not shown) may be placed on the piston 235, between the piston 235 and the retaining ring (with a slight clearance between the sleeve and the retaining ring).

In the piezoelectric module 232 shown in FIG. 13, the preloading assembly is held in place by the retaining ring 237. Alternatively, the retaining ring may be integral to the housing 236, i.e., a step may have been provided to seat the preloading springs 239. The piezoelectric module is then assembled from the bottom (constructed open) end and is then capped following the assembly.

In another alternative, at least one side of the housing 236 is open and the parts are assembled from this open side of the housing.

The piston 235 is designed to be long enough (alternatively, the spring 233 may have been constructed with an appropriate shoulder or a space may be used) to provide the gap 243 between the spring 233 and the top surface of the housing 236. During acceleration of the base structure 107, once a specified design acceleration limit is reached, the gap 243 is closed, thereby preventing further loading of the piezoelectric element 242. During deceleration of the base structure 107, once a specified design acceleration limit is reached, the gap 245 between the top surface of the spring 233 and the outer shell or frame 244 (which together with the housing 236 is fixed to the base structure using one of the aforementioned methods), is closed, thereby preventing further elongation of the spring 233 and its damage. Meanwhile, the piston 235 is pulled away from the piezoelectric element until the preloading springs 239 are have reached their near rigid (compressed) length, thereby preventing further movement of the piston. As a result, the piezoelectric element is protected from tensile loading.

In an alternative embodiment, the spring 233 may be protected from excessive levels of deceleration by elongating the head of the screw 234 past the top of the spring 233, and providing it with a head with the gap 245 with the top surface of the spring to act as a stop against excessive elongation of the spring.

Other variations of the embodiments disclosed above are also possible. For example, in all cases, the housing may be integral to the structure of the base structure (projectile); the housing may be a structure to support the generated loads or may encapsulate most or all the components of the generator and may even be hermetically sealed; the mode of vibration may be essentially axial, in torsion, in bending or in any of their combination; the piezoelectric element(s) may be of any shape and geometry and may or may not be of stacked construction (however, by using a stacked piezoelectric element, a lower voltage level but larger current can be achieved); the electrical characteristics of the piezoelectric element are also desired to be selected such that it allows efficient transfer of electrical energy to collection circuitry (such collection circuitry being well known in the art and not shown herein) which can mean that the impedance of the piezoelectric element is matched with the collecting circuitry to maximize the rate of energy transfer, e.g., to the storage capacitors; the taper and flange stops shown in FIGS. 8-10 may also be incorporated into any of the other embodiments; in all cases, the spring element may be designed to elastically (or partly elastically and partly plastically) collapse to its solid length in compression, thereby being protected from higher acceleration/deceleration that produces spring elongation.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. An apparatus for generating an electrical power upon an acceleration of the apparatus, the apparatus comprising:
    a piezoelectric member having at least a portion thereof formed of a piezoelectric material;
    a mass-spring unit having a spring element attached to the piezoelectric material and configured to compress and/or elongate within a predetermined limit, the mass-spring unit further having a mass offset from the piezoelectric material; and
    limiting means for limiting a loading on the piezoelectric member;
    wherein the mass-spring unit is configured to vibrate within the predetermined limit upon the acceleration of the apparatus, the vibration applying a cyclic force to the piezoelectric member to generate an output power from the piezoelectric member and wherein the limiting means comprises sandwiching the piezoelectric member between the spring element and an intermediate member, wherein one of the spring element and intermediate member have a stop for contacting the other of the spring element and intermediate member where the acceleration reaches a predetermined limit.

2. The apparatus of claim 1, wherein the mass is a portion of the spring element.

3. The apparatus of claim 1, wherein the mass is a separate portion from the spring element and attached thereto.

4. The apparatus of claim 1, further comprising means for preloading the piezoelectric material in compression.

5. The apparatus of claim 4, further comprising means for adjusting an amount of the preloading.

6. The apparatus of claim 1, further comprising a housing having an internal cavity for containing the piezoelectric member and mass-spring unit in the internal cavity.

7. The apparatus of claim 6, wherein the housing comprises means for collapsing in a direction of the acceleration to limit an amount of movement of the spring element.

8. The apparatus of claim 6, wherein the means for collapsing comprises the housing being an additional spring member having a greater spring coefficient than the spring element.

9. The apparatus of claim 6, wherein the means for collapsing comprises the housing having a curved shape for facilitating collapse thereof where the acceleration is greater than a predetermined limit.

10. The apparatus of claim 1, wherein the limiting means comprises an intermediate element having a tapered surface, wherein the spring element has an opposing tapered surface for mating with the tapered surface of the intermediate element where the acceleration reaches a predetermined limit.

11. The apparatus of claim 1, wherein the limiting means comprises the spring element having a flange for contacting a surface of an intermediate element where the acceleration reaches a predetermined limit.

12. The apparatus of claim 11, wherein the intermediate element has first and second surfaces and wherein the flange contacts the first surface where the acceleration reaches a predetermined limit and the flange contacts the second surface where a deceleration reaches another predetermined limit.

13. The apparatus of claim 1, wherein the mass-spring unit comprises fist and second mass-spring units having first and second spring elements and the piezoelectric member comprises first and second piezoelectric members corresponding to the first and second mass-spring units, respectively.

14. The apparatus of claim 13, wherein the mass is positioned between the first and second spring elements.

15. The apparatus of claim 14, wherein the first spring element, second spring element and mass are a single integral member.

* * * * *